United States Patent [19]

Ellis

[11] 4,423,594
[45] Jan. 3, 1984

[54] ADAPTIVE SELF-CORRECTING CONTROL SYSTEM

[75] Inventor: Stanley H. Ellis, Palm Beach Gardens, Fla.

[73] Assignee: United Technologies Corporation, Hartford, Conn.

[21] Appl. No.: 269,196

[22] Filed: Jun. 1, 1981

[51] Int. Cl.³ .............................................. F02C 9/28
[52] U.S. Cl. ................................... 60/39.28; 364/149; 364/431.02
[58] Field of Search .................. 60/39.28 R; 364/149, 364/150, 151, 431.02

[56] References Cited

U.S. PATENT DOCUMENTS

| | | | |
|---|---|---|---|
| 3,851,157 | 11/1974 | Ellis | 364/165 |
| 4,161,101 | 7/1979 | Drummond | 60/39.28 R |
| 4,249,238 | 2/1981 | Spang et al. | 364/431.02 |
| 4,258,545 | 3/1981 | Slater | 364/431.02 |

Primary Examiner—Louis T. Casaregola
Attorney, Agent, or Firm—Norman Friedland

[57] ABSTRACT

A control system for regulating a controlled device or process, such as a turbofan engine, produces independent multiple estimates of one or more controlled variables of the device or process by combining the signals from a plurality of feedback sensors, which provide information related to the controlled variables, in weighted nonordered pairs. The independent multiple estimates of each controlled variable are combined into a weighted average, and individual estimates which differ by more than a specified amount from the weighted average are edited and temporarily removed from consideration. A revised weighted average value of each controlled variable is then produced, and this value is used to limit or control operation of the device or process. Adaptive trim is provided to compensate for changes in the device or process being controlled, such as engine deterioration, by slowly trimming each individual estimate toward the mean, and includes error compensation which constrains the weighted sum of the adaptive trims to equal zero, thereby preventing the adaptive trim from changing the operating level of the device or process. A secondary editing circuit based on a majority rule principle identifies a failed feedback sensor and permanently excludes all individual estimates of the controlled variable based on the failed sensor. Editing boundaries are increased and adaptive trim rate is varied when a transient occurs in the operation of the device or process. Further transient compensation may be required for a system with more severe transient requirements, and this invention includes compensation to selected feedback parameters such as turbine temperature to account for differences between steady state and transient values.

9 Claims, 17 Drawing Figures

SCHEMATIC DIAGRAM OF SELF CORRECTING LOGIC

EDITING PROCESS

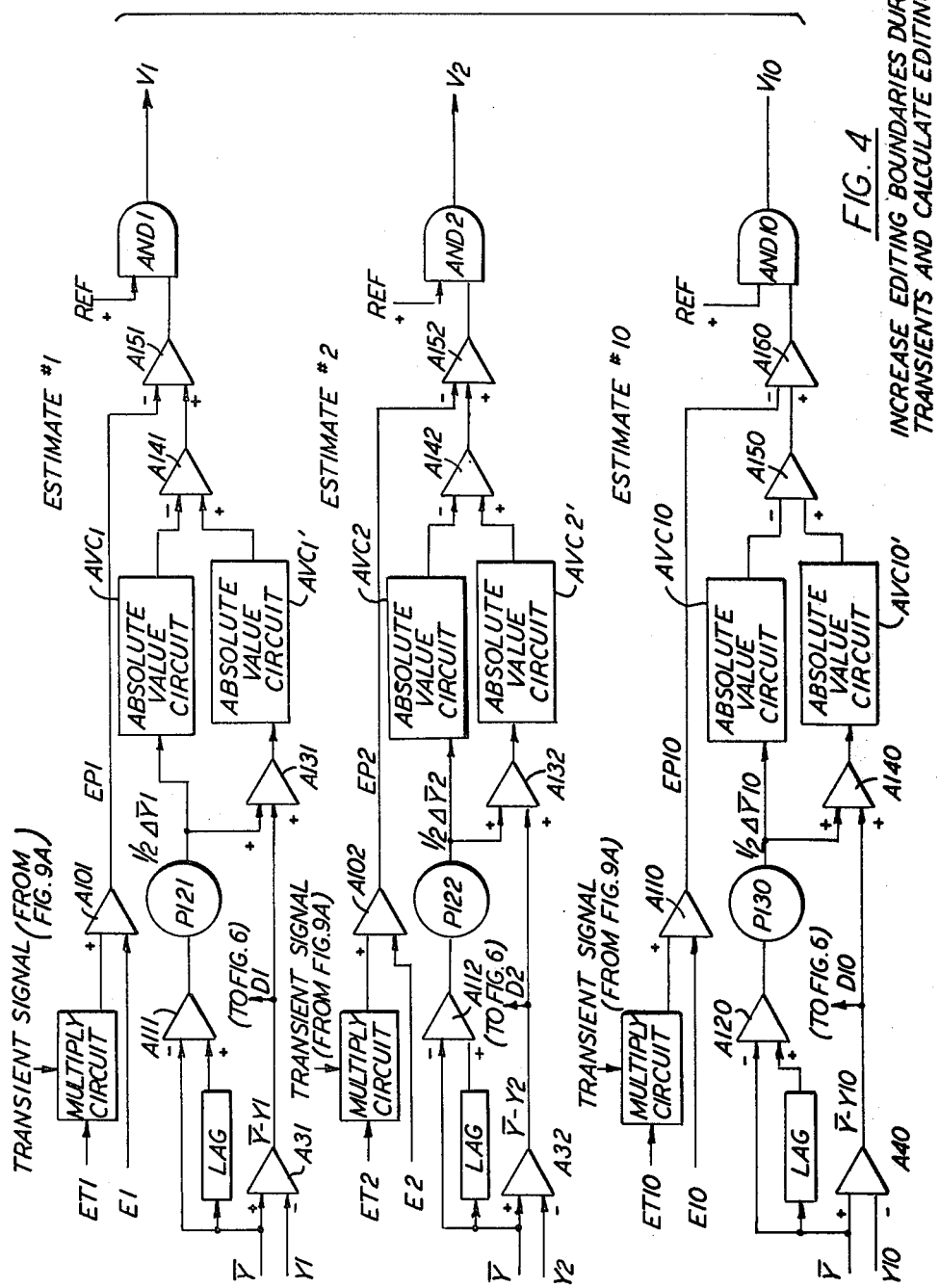

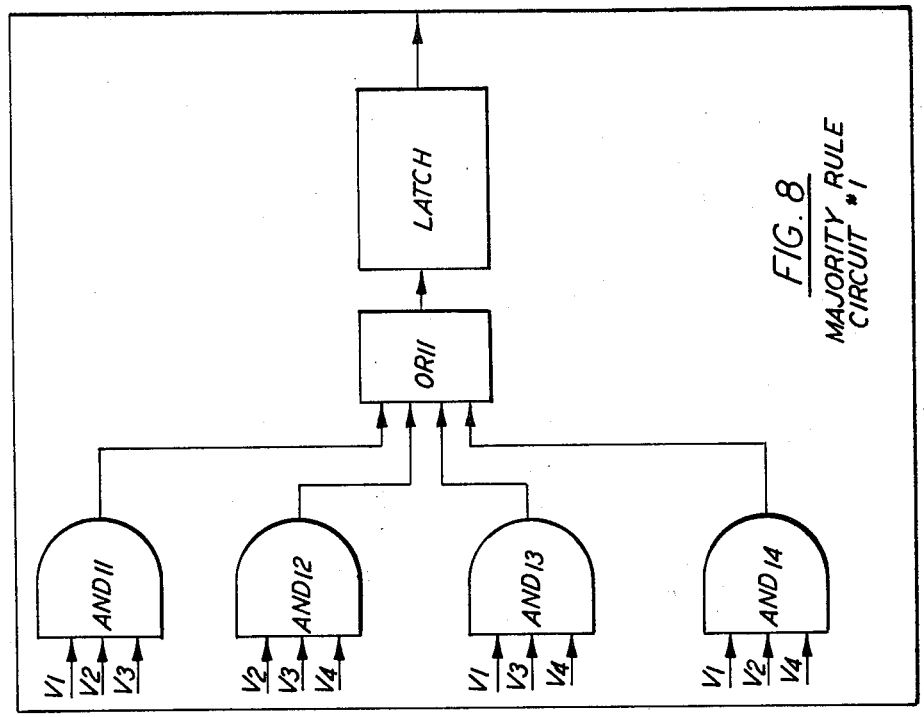
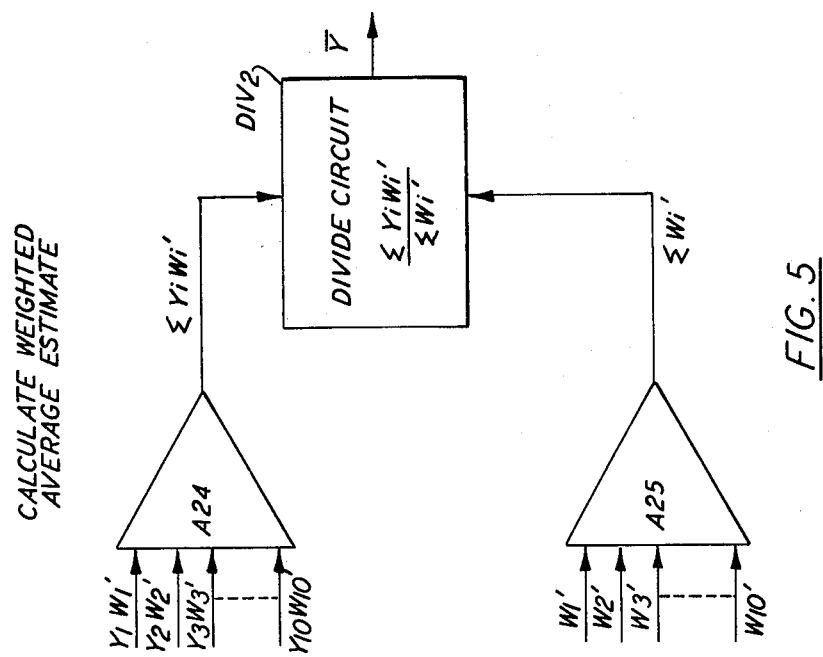

ADAPTIVE TRIM

MAJORITY RULE

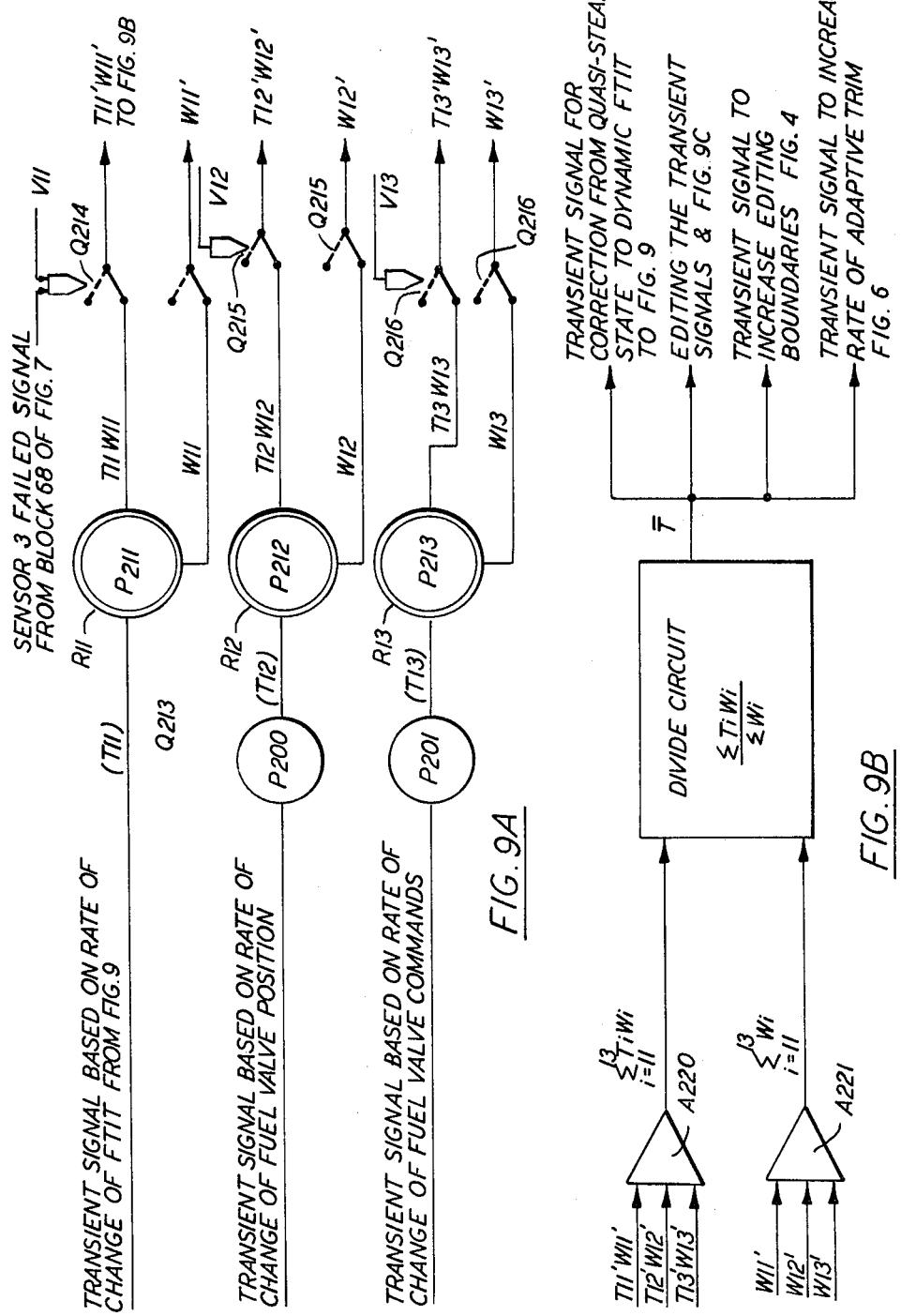

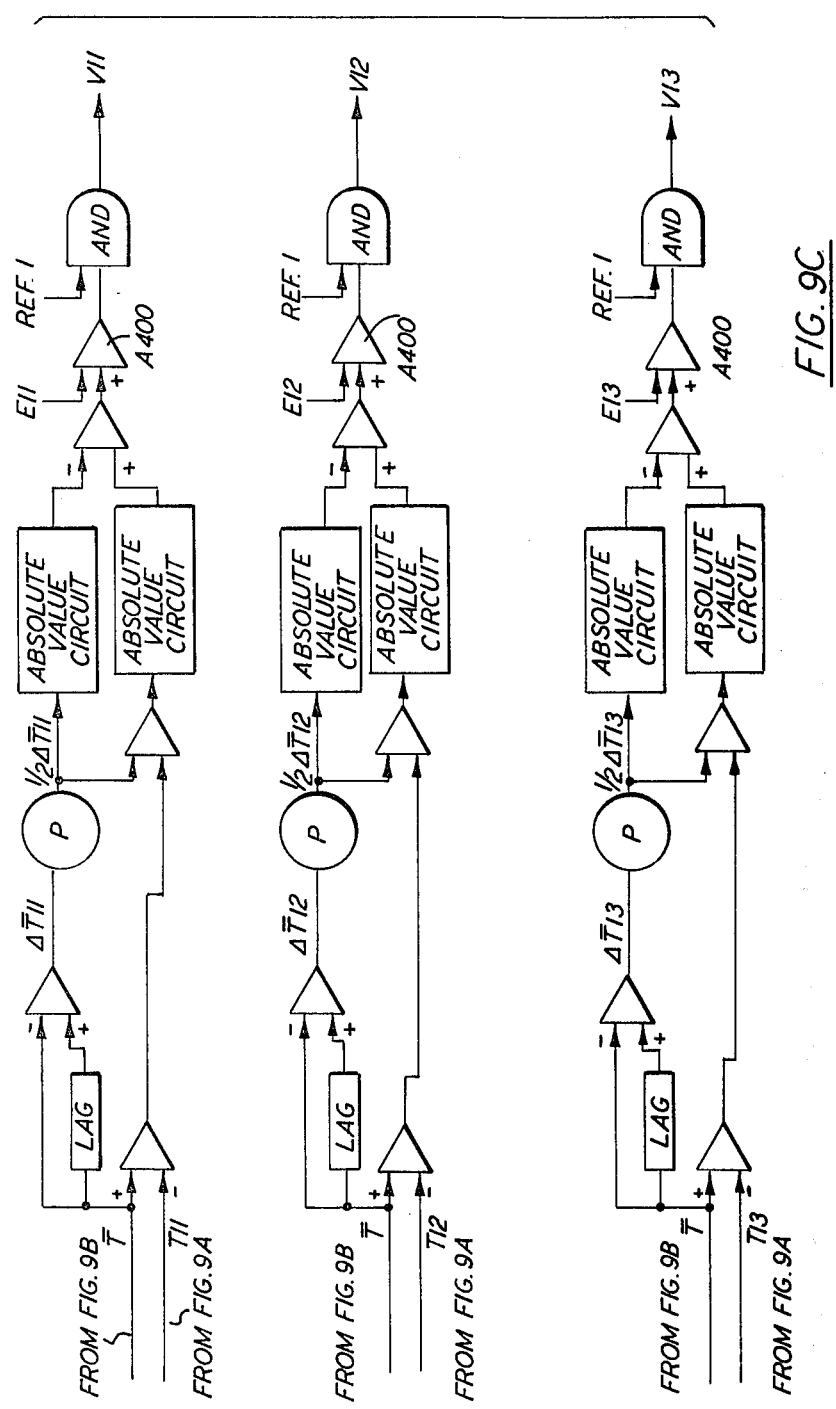

SUMMING WEIGHTING FACTORS

INHIBIT EDITING

INHIBIT EDITING DURING START UP

TIME

EDITING BOUNDARIES ARE TEMPORARILY INCREASED BY SENSOR FAILURE

ADAPTIVE SELF-CORRECTING CONTROL SYSTEM

DESCRIPTION

TECHNICAL FIELD

This invention relates to a control system for a controlled device or process, and particularly to a self-correcting control system which will maintain full capability after one or more failures of feedback sensor elements which provide information related to the controlled device or process. Knowledge of the operation of the device or process being controlled is used to cross check information produced by the feedback sensors and exclude failed sensors from control authority.

This invention further relates to a self-correcting control system which adapts itself to slow changes in the device or process being controlled, such as deterioration, without incorrectly identifying such changes as being due to failed sensors.

The invention is described with respect to a control system for a turbofan engine, but it is understood that the principles of the invention are applicable to any control system in which feedback sensors provide information related to the state of the controlled device or process, or of a controlled variable.

BACKGROUND ART

In present day control systems there is a demand for high reliability, but with minimum cost and complexity. For example, manned spacecraft applications have required that electronic control systems have both high reliability and the capability of operating normally after two consecutive failures, with a third failure being of the fail-safe type. Redundant controls and logic which delete failed elements satisfy these requirements, but the increased number of parts due to redundancy also increases the failure rate.

There are numerous techniques in the prior art which detect and/or correct failures in most portions of a digital electronic control system. For example, redundant actuators can be made to share the load by a current equalization technique in which a failed actuator can be detected by an abnormal current demand. The memory of a digital computer can automatically correct one or more errors and detect the presence of a further error, at the expense of additional storage. Correction of failures in feedback sensors, however, provides a more difficult problem because of the large number of types of sensors used in many control systems, and the large number of each type required for failure tolerance.

Failure tolerance is of increasing importance in the design of turbine engine control systems. Trends in advanced aircraft control systems are toward increased authority, digital electronic controls and greater integration between aircraft and engine. In these controls each sensor may affect every actuator, and a sensor failure could result in the mispositioning of several actuators and lead to loss of control.

The sensor portion of a control system is a key area because the number of sensors has a substantial effect on cost, weight, complexity and reliability. Sensors have a greater failure rate than other control system components because they are subjected to high vibrations, temperatures and pressures, while the need for fast, accurate response leads to fragile construction. Improved sensor reliability reduces failure rate, but cannot totally eliminate failures. When the result of sensor failure can be catastrophic, there is a need for failure tolerance in addition to high reliability, the important criterion being not less frequent failures, although this is desirable, but the ability to maintain control after a failure.

Since the conventional approach to failure tolerance, i.e., design redundancy, simply increases the number of components, and increases failure rate, cost and weight, it is desirable to obtain failure tolerance without adding components. This failure tolerance has been accomplished in self-correcting controls by using the coupling between signals given by knowledge of the process cycle. This approach, rather than adding sensors and connecting lines, adds computational logic, an area which is experiencing rapid improvements in both reduced size and lower cost.

In high performance turbine engines it usually is not possible to sense or measure directly key parameters required for engine control, such as surge margins, turbine inlet temperature, and airflow. Instead, limits are placed on parameters which can be measured more readily in order to maintain key variables within acceptable boundaries. This procedure normally results in more sensors than actuators. The number of sensors is further increased by the current practice of measuring parameters which must be limited for safety, such as rotor speeds and combustor pressure. The net result is that an engine with two control valves, such as a fuel valve and a nozzle actuator, can have six or more sensors controlling the position of these valves. Since only two sensors measuring different variables of operation can provide the information necessary for control of two actuators, additional sensors can provide redundancy by translating their outputs into estimates of the required variables using knowledge of the engine cycle.

Previous studies have been made with the aim of achieving redundancy without adding components. Wallhagen and Arpasi (NASA Technical Memorandum X-3043) investigated turbojet engine control in which an adaptive mathematical model was used to synthesize substitutes for failed sensor signals. Editing was limited to catastrophic failure detection. Montgomery and Caglayan (AIAA 12th Aerospace Sciences Meeting, NASA Langley Research Center) studied flight control systems, using a mathematical model to estimate system variables for several failure hypotheses, then selecting the most likely hypothesis. Their editing system can detect soft failures as well as catastrophic failures.

The present invention is based on the logic used for a self-correcting rocket engine control, and described in U.S. Pat. No. 3,851,157. This self-correcting control incorporates a linear matrix model of the engine which is used to estimate variables of operation. Data from all sensors are used to control each actuator, so that disconnection of a failed sensor still leaves adequate information for control. The editing process detects both soft and catastrophic failures. More specifically, the self-correcting control of U.S. Pat. No. 3,815,157 comprises a control system for a controlled device in which the output signals from a plurality of feedback sensors measuring selected system parameters are combined in weighted nonordered pairs to produce independent multiple estimates of one or more variables of operation of the control system, the controlled variables. The independent multiple estimates are combined into a weighted average of each controlled variable, and individual estimates which differ by more than a selected amount from the weighted average are considered invalid and temporarily removed from consideration. After editing of the invalid estimates of the controlled variable, a revised weighted average of each controlled variable is made from the remaining independent estimates. The revised weighted average estimate of each controlled variable is used to limit or control operation of the controlled device, for example by being compared with a signal indicative of the desired for commmanded value of the controlled variable, with any difference therebetween, an error signal, being used to regulate actuators which in turn control the controlled device, the engine. The predetermined weighting factors assigned to individual estimates of each controlled variable reflect both the accuracy of the feedback sensors and the ability of the feedback parameters being measured to form an accurate estimate of the controlled variable. Individual feedback sensor pairs whose estimates of a controlled variable have been edited are continuously monitored, and whenever the edited sensor pair produces an estimate of a controlled variable which falls within the prescribed boundaries, the estimate is reconnected. The editing boundaries are increased during a transient in the process being controlled to avoid editing valid estimates of the controlled variable during transients.

In the control system of U.S. Pat. No. 3,851,157, a change in the process may be incorrectly identified as a sensor failure, resulting in the editing of valid estimates of a controlled variable. For example, changes in the process of a turbine engine can occur by virtue of deterioration, variations in the operating environment, overhaul or repair, and/or changes in operating requirements such as bleed or power extraction. Consequently the control system of the prior art patent, while extremely reliable when used with processes which do not vary significantly, cannot automatically adapt itself to larger changes in the process level which occur over a period of time.

The present invention is an improvement of the prior art control system of U.S. Pat. No. 3,851,157 and provides a system which automatically adapts the editing procedure to changes that may occur in the process, specifically the engine cycle, such as those caused by engine deterioration. Changes in the operating environment and/or operating conditions may be treated in the same manner. As a result, the increased amount of stored information and the number of calculations required are minimal, and the accuracy of the control system after a failure is improved.

It is therefore an object of the present invention to provide a self-correcting control system for a controlled device which automatically adapts to changes in the process.

A further object of this invention is a self-correcting control system for a controlled device which will provide accurate control even after failure of one or more feedback sensors.

Another object of this invention is an adaptive self-correcting signal control system for a controlled device in which error compensation is provided to prevent cumulative errors due to lack of precision in the control system.

A still further object of this invention is a self-correcting control system for a controlled device in which the failure of a feedback sensor is identified, and all computations involving the failed sensor are permanently deleted, the failed sensor being flagged for identification.

Another object of this invention is a self-correcting control system for a controlled device in which transients in the controlled process are identified and the linear matrix model of the engine is modified to prevent improper identification of failed sensors during the transient.

A still further object of this invention is an improved, adaptive self-correcting control system for a turbojet engine.

DISCLOSURE OF INVENTION

In accordance with the preferred embodiment of the present invention there is disclosed a self-correcting, adaptive control system for a controlled device such as a turbofan engine. The state of the engine is set by the position of a plurality of control actuators controlled, for example, by a main engine control system in response to the actual state of the engine as measured by feedback sensors, and the desired state of the engine as determined by the position of the power lever as set by the pilot. The feedback sensor signals may contain error. The feedback sensor signals, some of which may be redundant, are converted into five corrected feedback parameters, from which all non-ordered pairs provide ten independent estimates of each of five controlled variables of operation. All estimates of each controlled variable are combined to form a weighted average estimate of each controlled variable, with the more accurate estimates having greater weight. To each independent estimate is added an adaptive trim term which is used to compensate for engine process variations.

Each independent estimate of a controlled variable is then compared with the weighted average of the controlled variable, and any estimate which differs by a preselected amount from the weighted averaged is eliminated from consideration, a process known as editing. The remaining estimates are used to produce a revised, weighted average of the controlled variable (validated controlled variable). Ground trim signals are added to the validated control variables which are then fed to the main control to limit or control operation of the engine, such as by regulating fuel flow.

Changes in the process being controlled, such as long term deterioration of the engine due to wear, or inability of the linear matrix model of the engine to describe the engine process, can result in incorrect editing, so an adaptive trim is provided for each independent estimate of the controlled variable, the adaptive trim taking the form of integrators which slowly reduce the difference between each valid individual estimate and the average of the valid estimates, thereby limiting the duration for which a deviation can exist. However, since integrators are subject to drift, which could cause unintentional changes in the process level by incorrectly indicating a process change where none has occurred, error compensation is included in the adaptive trim to constrain the weighted sum of the adaptive trims for each controlled variable to zero, thus preventing the adaptive trim from modifying the ground trim.

Differences between the linear matrix model and the true engine process will develop faster during transients. To compensate for this, the adaptive trim rate is increased during engine transients. Adaptive trim rate is reduced when a sensor is temporarily disconnected. It should not be eliminated entirely, otherwise a good estimate that has been temporarily disconnected may not be able to adapt to a process change and therefore may be permanently disconnected. On the other hand, fast adaptive trim may reconnect a bad estimate and thereby admit unacceptable sensor errors to the control circuits. Even with reduced adaptive trim rate it is important to limit the duration for which bad estimates are connected to adaptive trim circuits because they can bias average estimates of controlled variables. Consequently, a second editing level causes permanent disconnection and complete cessation of adaptive trim.

When three or more of the four estimates of a controlled variable produced by an error in one feedback signal are temporarily disconnected, such as may occur by virtue of a failed sensor, a majority rule logic permanently disconnects all four estimates by setting the weighting factor to zero, disconnecting the estimates from the adaptive trim circuit, and flagging the failed sensor.

Estimates of editing variables have higher variability during transients due to approximate compensation for process lags and sensor lags. For example, the rotating components of a turbofan engine have a greater amount of inertia than those of a rocket engine while the acceleration requirement from idle to maximum thrust is approximately the same. This results in appreciable lag between the increase in turbine temperature and the subsequent increase in speed. Therefore the turbine temperature sensor does not have the same relation to the other sensors during transients as during steady state operation. The turbine temperature sensor reads higher than steady state during accelerations and lower during decelerations, and compensation to the turbine temperature circuit is required. Editing boundaries are consequently widened symmetrically during transients to prevent deletion of good estimates. This widening of editing boundaries can be proportional to the estimated difference between transient and steady state turbine temperature to account for error in compensation of rotor speed lagging turbine temperature. This signal can also be used to compensate for errors in sensor lag compensation. A further nonsymmetrical widening of editing boundaries allows for spurious transients caused by sensor failures. Editing decisions may be made separately for each controlled variable, or for simplicity editing decisions for all controlled variables may be based on only one controlled variable.

The linear matrix model of the engine is simplified by describing only steady state relationships between ideal feedback sensors (without lag) and the controlled variables. In a turbofan engine there are usually approciable differences in lag between different types of sensors. In addition to rotor speed, pressures have appreciable lag behind turbine temperature. In order to use a steady state model of the engine, dynamic compensation is required for both sensor lag and engine lags, otherwise the editing procedure would delete good sensors during a transient. In the preferred embodiment sensor signals are first corrected for lag in the usual manner by adding a correction which is directly proportional to the rate of change of the sensed signal and also proportional to the sensor time constant. After the turbine temperature sensor has been corrected for lag, it is further corrected to a quasi-steady-state value by processing it through a first order lag, which represents the lag of rotor speed behind turbine temperature. The quasi-steady-state turbine temperature is then used in the self-correcting logic in conjunction with the steady state engine model. The quasi-steady-state validated turbine temperature leaving the self-correcting logic is restored to the correct transient value before it is used for engine control. Because the signal subtracted from fan turbine inlet temperature is tied to the signal added to the validated turbine inlet temperature, inaccuracies in the transient signal do not affect control but only impact the editing process. The impact of such inaccuracies in editing is lessened by increasing editing boundaries during transients and also by the adaptive trim circuits.

Other features and advantages will be apparent from the specification and claims and from the accompanying drawings which illustrate an embodiment of the invention.

BRIEF DESCRIPTION OF THE DRAWINGS

FIG. 4 is a diagram for calculating the editing signal of the self-correcting control of FIG. 2.

FIG. 5 is a diagram calculating the weighted average estimate of the self-correcting control of FIG. 2.

FIG. 8 is a schematic diagram of the majority rule circuit #1 of FIG. 7.

FIGS. 9, 9A, 9B and 9C are analog circuit diagrams of a transient signal.

BEST MODE FOR CARRYING OUT THE INVENTION

Figure 1:
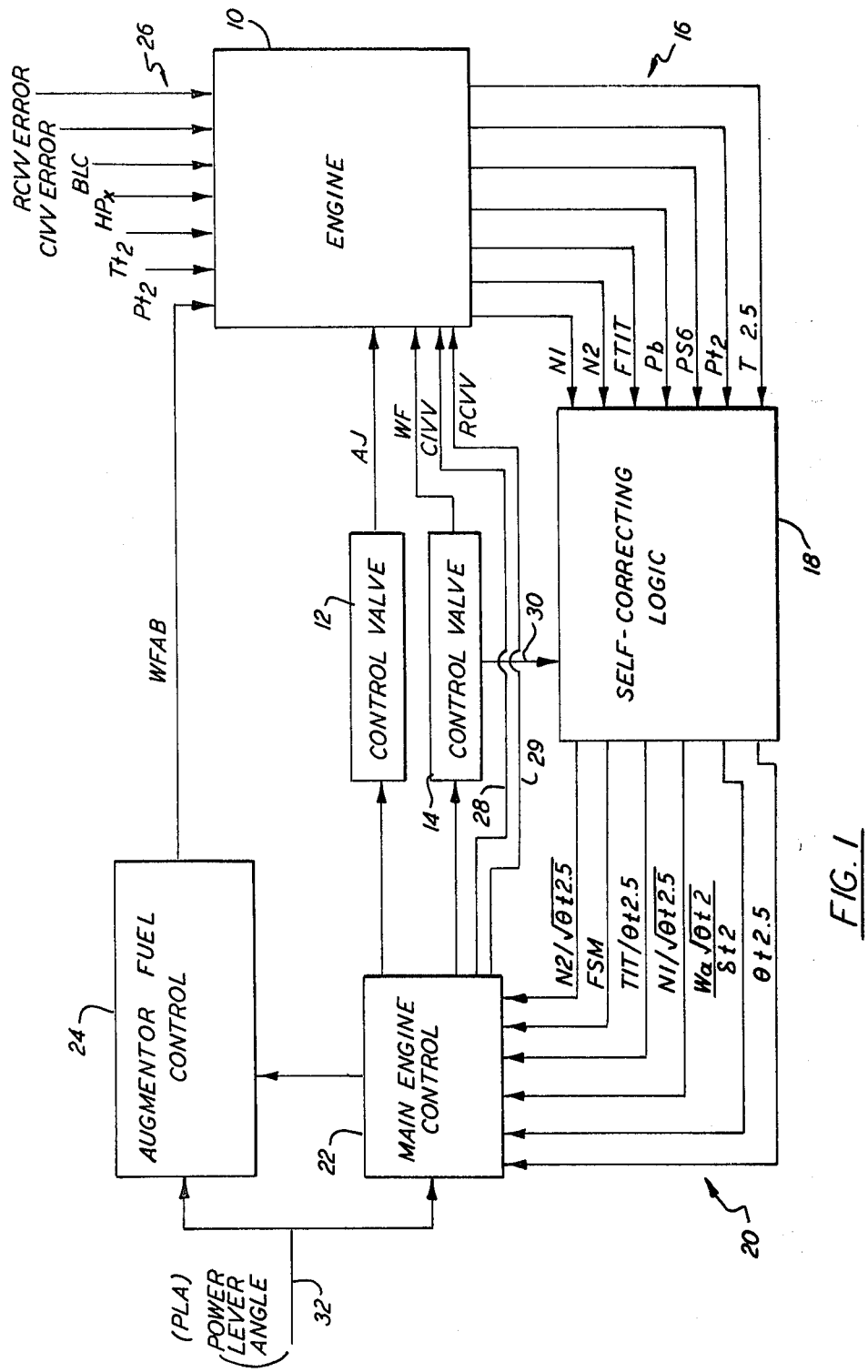
FIG. 1 is a schematic diagram of a control system for an augmented turbofan engine using self-correcting logic.

The self-correcting, adaptive control system decribed herein is broadly applicable to any process subject to control in which the operation of the process is known. As a preferred embodiment of the invention, the control system is described with respect to a turbofan engine, but it will be apparent to those skilled in the art that any control system in which sensors provide information as to the state of a controlled process variable may be implemented according to the present invention. The greater the knowledge of the process being controlled, the greater the accuracy with which control can be accomplished. Practical limitations, such as cost, space, weight, etc., will also influence the precise implementation of the control system.

As described herein, the invention is embodied in a self-correcting logic which is illustrated in block diagram form and by use of analog electronic circuitry such as amplifiers, dividers, potentiometers and the like. The invention is described in this manner primarily for ease of illustration, since the best mode of implementation envisioned at this time by the inventor involves the use of a computer, most likely either a multipurpose or special purpose, stored program, digital computer suitably programmed to perform the necessary logic and other functions disclosed herein. While implementation of the invention using purely analog electronic circuitry, or even hydraulic or pneumatic circuitry, is within the state of the art, the weight, cost and complexity of these implementations does not appear advantageous at this time.

A requirement of the present self-correcting control system is that there must be at least as many different types of feedback sensor signals as there are actuators to be controlled, and more total feedback sensors than there are actuators to be controlled to provide for accurate and reliable operation after failure of a feedback sensor. As defined herein, a self-correcting control is a control which can still position actuators correctly after a key sensor has failed. Feedback parameters are defined as combinations of sensor signals which are used as inputs to the model of the process which estimates controlled variables. In the preferred embodiment of this invention, a control system for the control of two turbofan engine actuators is described, therefore, there must be at least two different types of feedback sensors. There may be a plurality of sensor signals of any one type, but this is not a requirement of the invention. Another requirement is that the sensor signals are related by the process being controlled in a known fashion. For a system having two actuators, there must therefore be at least three sensor signals to tolerate one failure, four sensor signals to tolerate two failures, and so on. In other words, in a system in which two actuators are controlled, there must remain at least two different types of good sensors after a failure has occurred. A further requirement is that there must also be as many controlled variables as there are actuators being controlled. Controlled variables are defined as a set of state variables used to limit or control operation of the process. State variables are defined as a set of variables that completely describe the state of the process.

FIG. 1 shows schematically a control system for an augmented turbofan engine. The invention will be described with respect to the Pratt & Whitney Aircraft Group's F-100 augmented turbofan engine, although other engines are equally applicable. The F-100 engine is a twin spool, low bypass ratio, augmented turbofan engine with a three-stage fan/two-stage turbine low rotor, ten-stage compressor/two-stage turbine high rotor, and an augmentor enclosing both gas generator and fan streams with a single outer duct. Inlet guide vanes with movable trailing edges to achieve variable airfoil camber are used ahead of the fan to improve inlet distortion tolerance and fan efficiency. These variable vanes are called compressor inlet variable vanes. The first three stators of the high compressor are variable to improve starting and high Mach number characteristics. These variable stators are called rear compressor variable vanes. Airflow bleed is extracted at the compressor exit and discharged through the fan duct during starting. The exhaust nozzle for the engine is a balanced beam design with actuated divergent flap.

Referring to FIG. 1, the turbofan engine is shown in block form by reference numeral 10. The state of the engine is set by the position of the control valves 12 and 14 which control respectively the exhaust nozzle area, $A_J$, and the main fuel flow $W_F$. The state of the engine is measured by a plurality of sensor signals 16 which may contain error. For purposes of illustration the sensor signals are: $N_1$, low rotor speed; $N_2$, high rotor speed; FTIT, fan turbine inlet temperature; $P_b$, burner pressures, $P_{S6}$, augmentor static pressure; $P_{t2}$, average engine compressor inlet pressure; and $T_{t2.5}$, fan discharge temperature measured in the duct stream. There are two $P_{t2}$ sensors, and four $T_{t2.5}$ sensors. The sensor signals are transformed by the self-correcting logic 18 to validated controlled variables of operation 20 required by the main engine control 22. Validated controlled variables as defined herein means estimates of controlled variables after editing. Editing is defined as the process of detecting failures and excluding failed signals from estimates of controlled variables. The validated controlled variables 20 as illustrated herein are: $N_2/\sqrt{\theta_{t2.5}}$, compressor corrected speed; FSM, fan surge margin; $TIT/\theta_{t2.5}$, combustor exit corrected temperature; $N_1/\sqrt{\theta_{t2.5}}$, fan corrected speed;

$$\frac{W_a \sqrt{\theta_{t2}}}{\delta_{t2}},$$

corrected airflow; and $\theta_{t2.5}$, fan discharge corrected temperature. The augmentor fuel control 24, for purposes of this invention, has been treated as a variable affecting the engine process, and the augmentor fuel flow, WFAB, is shown together with other variables which affect the engine process, namely: $P_{t2}$, average inlet engine pressure; $T_{t2}$, compressor discharge temperature; HPX, horsepower extraction; BLC, customer bleed; error in CIVV, compressor inlet variable vane position; and error in RCVV, rear compressor variable vane position. The variables that affect the engine process are shown as reference numeral 26. It is not necessary to measure all the variables, providing that sufficient information is obtained to position the control valves 12 and 14 that have closed loop control over the engine 10. For purposes of illustration, the fan and compressor variable geometry, CIVV and RCVV, are scheduled by validated controlled variables via signal lines 28 and 29 respectively.

As will be described subsequently in detail, a signal indicative of the position of the main fuel flow control valve 14 is fed to the self-correcting logic block 18 via signal line 30. The entire system is under control of the power lever angle, PLA, a signal indicative of which is fed via a signal line 32 to the main engine control 22, and the augmentor fuel control 24.

It is apparent that other sensor signals than those illustrated by reference numeral 16 may be used, or that additional sensor signals may be provided for redundancy. With respect to the process it is important only that sufficient information be available to define the state of the process. Likewise, the validated controlled variables 20 selected for the disclosed embodiment of the invention may also be varied, the main criterion being that sufficient information is available to accurately position actuators that have closed loop control over the process, in this case the engine 10. In the present example, closed loop control valves may also be provided in signal lines 28 and/or 29 to control compressor inlet variable vane position, CIVV, and/or the rear compressor variable vane positon, RCVV. Considerable simplicity, however, results by using conventional control of the engine geometry in which CIVV, RCVV, and engine bleeds are scheduled as a function of corrected speeds. It is sufficient that the main engine control 22 be provided with accurate information to control the state of the engine 10, whether by way of closed loop control valves or by way of direct scheduling, both of which are shown in FIG. 1.

Since there are only two independent actuators in the embodiment disclosed herein, the control valves 12 and 14 of FIG. 1, quasi-steady state estimates of each controlled variable 20 can be determined from a pair of feedback parameters using a linearized model of the engine that is contained in the self-correcting logic 18 of FIG. 1. The self-correcting logic 18 is described in block diagram form in FIG. 2. With reference to FIG. 2, there are seven sensed signals 16, $N_1$, $N_2$, FTIT, $P_b$, $P_{S6}$, $P_{t2}$ and $T_{t2.5}$. Redundant readings are provided for two of these sensed signals, namely two readings of $P_{t2}$, and four readings of $T_{t2.5}$, since these signals measure independent variables that have a significant effect on the engine process and cannot be cross-checked using other engine parameters. The $T_{t2.5}$ signal, which is indicative of compressor inlet temperature, is an important fundamental signal. Consequently, the four readings of $T_{t2.5}$, each from an independent sensor, are fed to an edit block 34 where there is provided an editing procedure which provides a correct signal after at least two failures of the $T_{t2.5}$ sensors. Editing circuits of this type, also known as redundancy circuits, are well known in the art and need not be described in detail, examples being shown in U.S. Pat. Nos. 3,614,401 and 3,544,778. A further function of the editing circuit 34 is to transform the $T_{t2.5}$ signal into a signal indicative of fan discharge corrected temperature, $\theta_{t2.5}$, which is equal to $T_{t2.5}/518.7$. The editing circuit may perform this function by a simple division circuit, not shown. The fan discharge corrected temperature signal, $\theta_{t2.5}$, is fed via signal line 36 to a block 38 labeled calculate corrected parameters.

The remaining six sensor signals 16 including the redundant readings of $P_{t2}$ are also fed to the block 38. The sensor signals 16 are modified in block 70 to compensate for sensor and rotor speed lags and to correct the FTIT signal to an equivalent steady state value. The preferred lag compensation procedure is shown in detail in FIG. 9.

The seven types of sensor signals 16 are converted in block 38 into five corrected feedback parameters shown on signal lines 40. The five corrected parameters are: corrected low rotor speed, $N_1/\sqrt{\theta_{t2.5}}$; corrected high rotor speed, $N_2/\sqrt{\theta_{t2.5}}$; corrected fan turbine inlet temperature, $FTIT/\theta_{t2.5}$; corrected burner pressure, $P_b/P_{t2}$; and corrected augmentor static pressure, $P_{S6}/P_{t2}$. One of the redundant $P_{t2}$ readings is combined with the $P_b$ sensor to give the corrected parameter $P_b/P_{t2}$, while the other is combined with the $P_{S6}$ sensor to give the corrected parameter $P_{S6}/P_{t2}$. The corrected parameters 40 formed from the seven types of sensor signals provide engine parameters which are applicable over a larger range of operating conditions than by using the sensor signals directly.

The five corrected feedback parameters 40 are fed into block 42 in which ten estimates of each of the five controlled variables 20 are calculated using all nonordered combinations of the five corrected feedback parameters 40.

If an additional redundant sensor were provided for a key parameter because it is important to the control mode or because it is important to define the rate of change of a parameter accurately, then an additional four estimates of each of the five controlled variables would result from pairing a parameter based on the redundant sensor with each of the four types of feedback parameter that are independent of the additional sensor. The self-correcting circuits in this case would then be a direct extension of the circuits described below for ten estimates of each controlled variable.

For purposes of simplicity the remaining description will be directed to the computation of only one of the five controlled variables, corrected compressor speed $N_2/\sqrt{\theta_{t2.5}}$. It is apparent that block 42 of FIGS. 2A & 2B must provide ten estimates of each of the five controlled variables, totaling 50 estimates. Consequently, it will be understood that block 42 and the remaining blocks shown in FIGS. 2A & 2B, and in most of the subsequent figures, are applicable only to a single controlled variable, and that four additional sets of similar circuits must be used to provide the estimates of the other four controlled variables. Since it is anticipated that the best mode for practicing the present invention will be by use of a computer, it is evident that the calculation of all five controlled variables can be performed simultaneously, and that one skilled in the art will recognize from a description of the calculation of one controlled variable that similar methods are applied to the calculations for the other four controlled variables.

Referring again to FIGS. 2A & 2B, the ten estimates of the selected controlled variable are shown by ten arrows indicated by reference numeral 44. The ten estimates are fed to a circuit 46, labeled adaptive trim, which consists of integrators for each of the ten estimates of the controlled variable which slowly trim each of the ten independent estimates to null any error between each independent estimate and a corresponding weighted average estimate. The calculation of each of the ten estimates of the controlled variable performed in block 42 is described in detail in FIG. 3, and the operation of the adaptive trim of block 46 is shown in detail in FIG. 6.

Figure 3:
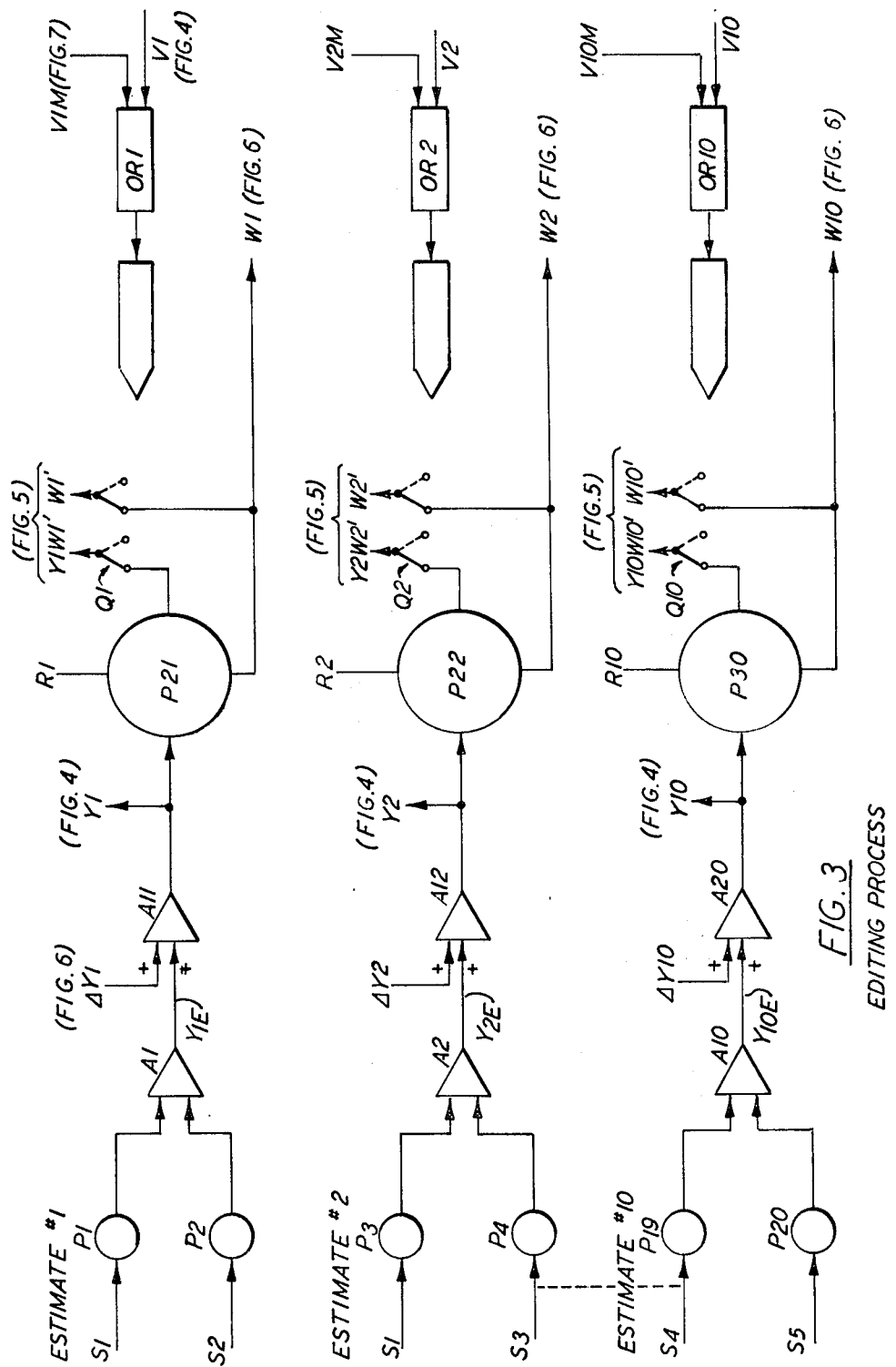
FIG. 3 is a diagram of the editing process logic of the self-correcting control of FIG. 2 which provides multiple estimates of the controlled variable, the weighting factors, and the editing.

After the adaptive trim has been provided to each of the ten independent estimates of the controlled variable, the ten estimates, as shown by the ten arrows 48, are fed to a block 50, labeled weight estimates. In block 50 a weighting factor is provided to each of the ten estimates of the controlled variable using two criteria: first, more accurate estimates are given more weight; and second, no one sensor can have more than 45% of the votes. These criteria will prevent a failure in a heavily weighted sensor from causing deletion of good sensors. Details of the weighting computation are shown in FIG. 3.

After application of the proper weighting factor in block 50, the ten estimates of the controlled variable are fed simultaneously to a block 56, labeled weighted average of variable, and to a block 58, labeled edit by setting weight of invalid estimates to zero, as shown by arrows 52 and 54, respectively. In block 56, and illustrated more specifically in FIG. 5, the ten weighted estimates of the controlled variable are summed and divided by the sum of the weighting factors to produce a weighted average of the controlled variable. The weighted average is then fed to editing circuit 58 via signal line 60. Editing boundaries are set on either side of the weighted average estimate of the controlled variable. In block 58 estimates that lie outside the editing boundaries are disconnected from the control by setting the appropriate weighting factors to zero. These weighting factors are also set to zero for future calculations in block 50 as shown by the arrowheads on both ends of lines 54. The remaining weighting factors are effectively increased by dividing the sum of the valid weighted signals by the sum of the valid weighting factors, as shown in FIG. 5. Consequently, those estimates produced by the output from a failed sensor will be deleted, as well as those estimates which provide an erroneous estimate of the controlled variable due to malfunctions in other portions of the control. This procedure deletes not only the terms containing the failed sensor but also compensating terms containing other sensors and adaptive trim so that deletion of a sensor will not cause a spurious shift in the estimate of a controlled variable. As will be described subsequently, only estimates outside editing boundaries are deleted, and if an estimate returns to within the editing boundaries it will be reconnected by reinstating the original weighting factor. The computation of the editing boundaries and the determination of editing signals, $V_1-V_{10}$, are shown in FIG. 4, while the actual editing is shown in FIG. 3.

This temporary editing procedure deletes individual estimates of controlled variables rather than sensors. The sensor is judged not on its own error but on the error in the estimate of the controlled variable. However, a majority rule editing circuit 62 is connected to editing circuit 58 via signal line 64, the majority rule editing being a permanent editing procedure. Each sensor affects four estimates of a controlled variable. If three or more of the four estimates in an error set are temporarily disconnected, then the majority rule logic of block 62 permanently disconnects all four estimates by setting the weighting factor to zero, disconnecting the estimates from the adaptive trim circuits, and flagging the failed sensor via signal line 66 and block 68. The majority rule editing is described in greater detail with respect to FIGS. 7 and 8.

Editing boundaries are increased when the control system senses that a transient is occurring in the process since estimates of controlled variables have a higher variability during transients due to the approximate compensation for process lags and sensor lags. Editing boundaries are consequently widened during transients to prevent deletion of good estimates.

The occurrence of a transient in the engine is determined in block 70, and is shown in detail in FIGS. 9, 9A, 9B and 9C. Briefly, a transient signal is produced on signal line 72. The generation of the transient signal may be produced in response to one or more of the following acceleration indicators: first, the rate of change of fan turbine inlet temperature; second, the measured rate of change of high rotor speed, $N_2$; third, the rate of change in fuel valve position; and fourth, the rate of change of fuel valve commands. The transient signal on signal line 72 is fed to a circuit 74 which will vary the gain of the adaptive trim 46 via line 75 as described more specifically with respect to FIG. 6. The transient signal on line 72 is also fed to a block 76, labeled increase editing boundaries which, in turn, provides a signal via signal line 78 to block 58 which will widen the editing boundaries during transients. This transient signal represents the lag of rotor speed behind turbine temperature. It is equal to the difference between the true value of fan turbine inlet temperature and the fan turbine inlet temperature required to obtain high rotor speed, $N_2$, under steady state conditions. A transient signal, suitably scaled is also fed to block 21, FIG. 2B to convert turbine temperature from the quasi-steady-state value used in the self-correcting logic to the transient value used for control.

The editing boundaries are also increased when the weighted average of the controlled variable, computed in block 56, changes rapidly such as caused by the spurious change resulting from a sudden sensor failure. The weighted average of the controlled variable is fed from block 56 via signal line 80 to a block 82, labeled rate of change of average variable. A signal from block 82 via signal line 84 to block 76 will widen editing boundaries unsymmetrically to prevent incorrect editing during previous transients. This widening of the editing boundaries is described more specifically in conjunction with FIGS. 4 and 12.

It will be assumed for purposes of the present description that four of the ten estimates of the controlled variable have been edited in block 58. The remaining six estimates are shown by arrows 86 which are fed to a block 88 in which there is computed a weighted average of the remaining valid estimates of the controlled variable. This computation is described in greater detail in FIG. 5.

After editing, the adaptive trim in block 46 is updated as shown by arrows 90 which transmit the remaining valid estimates of the controlled variable to a block 92, labeled update adaptive trim. The output from block 96 is fed via signal line 94 to block 46.

The estimates of the validated controlled variables shown by reference numeral 20 have ground trim added to them and are then fed from block 88 to the main engine control 22 of FIG. 1. As noted previously, the computation of only one of the controlled variables has been described, and it is understood that five separate computations must be made in order to produce the estimates of the five controlled variables 20. It is further noted that the validated controlled variables 20 are corrected signals, that is, some contain the terms $\theta_{t2.5}$ and/or $\delta_{t2}$ which is defined at $P_{t2}/14.7$. Uncorrection may be required to place the validated controlled variables in a form useful by the main control 22. Uncorrection involves only simple mathematical computations. For purposes of the present invention, however, it is immaterial whether the main control 22 uses the data in its corrected or uncorrected form. The TIT signal is transformed from the quasi-steady-state value estimated by the self-correcting logic to the transient value used for control by adding the transient signal.

The validated variables of operation 20 fed to the main control 22 provide the intelligence for positioning the actuators 12 and 14 and for controlling CIVV and RCVV via signal lines 28 and 29, respectively.

Figure 2A:
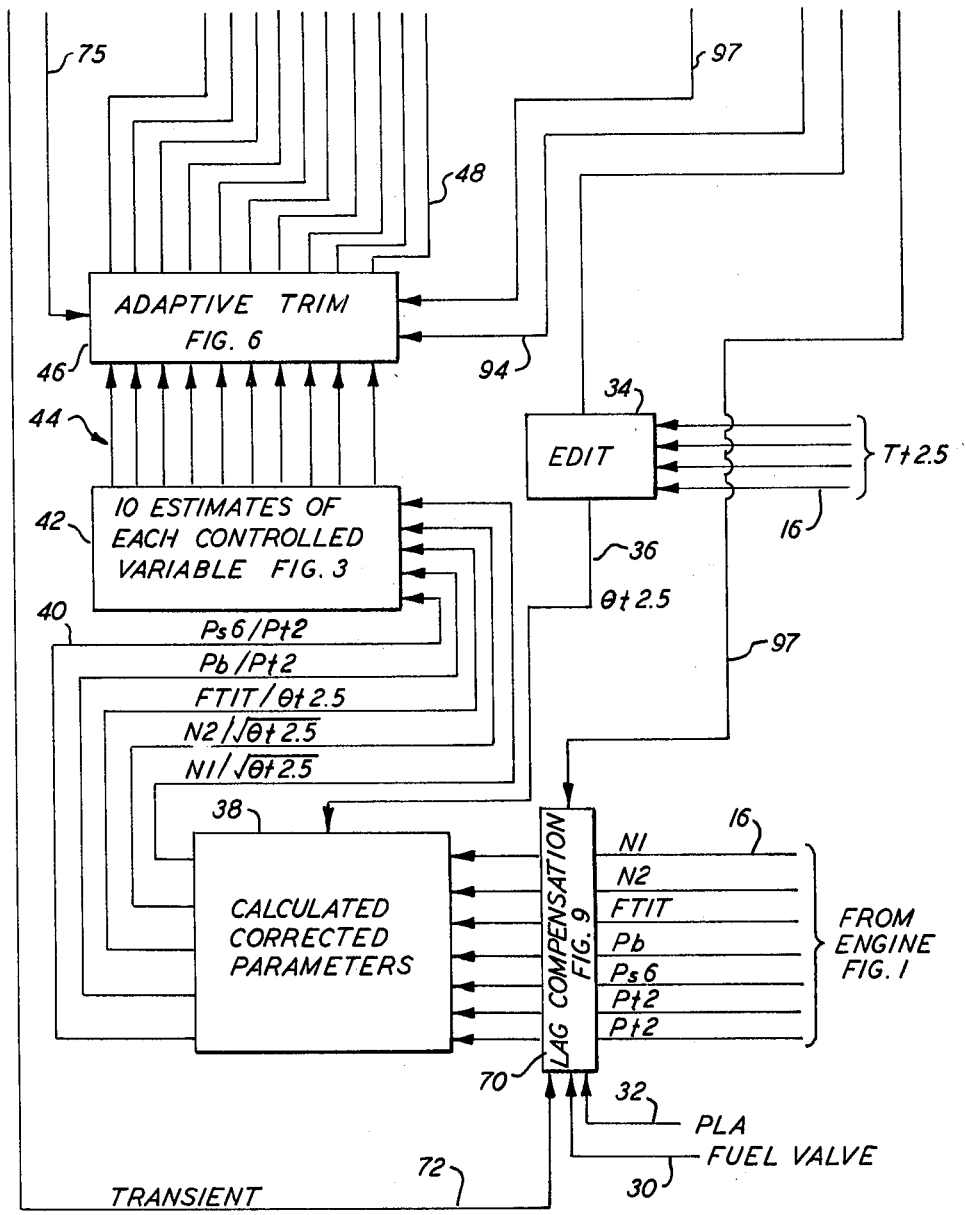
FIG. 2 is a schematic diagram in block diagram form of the self-correcting logic of FIG. 1.
Figure 2B:
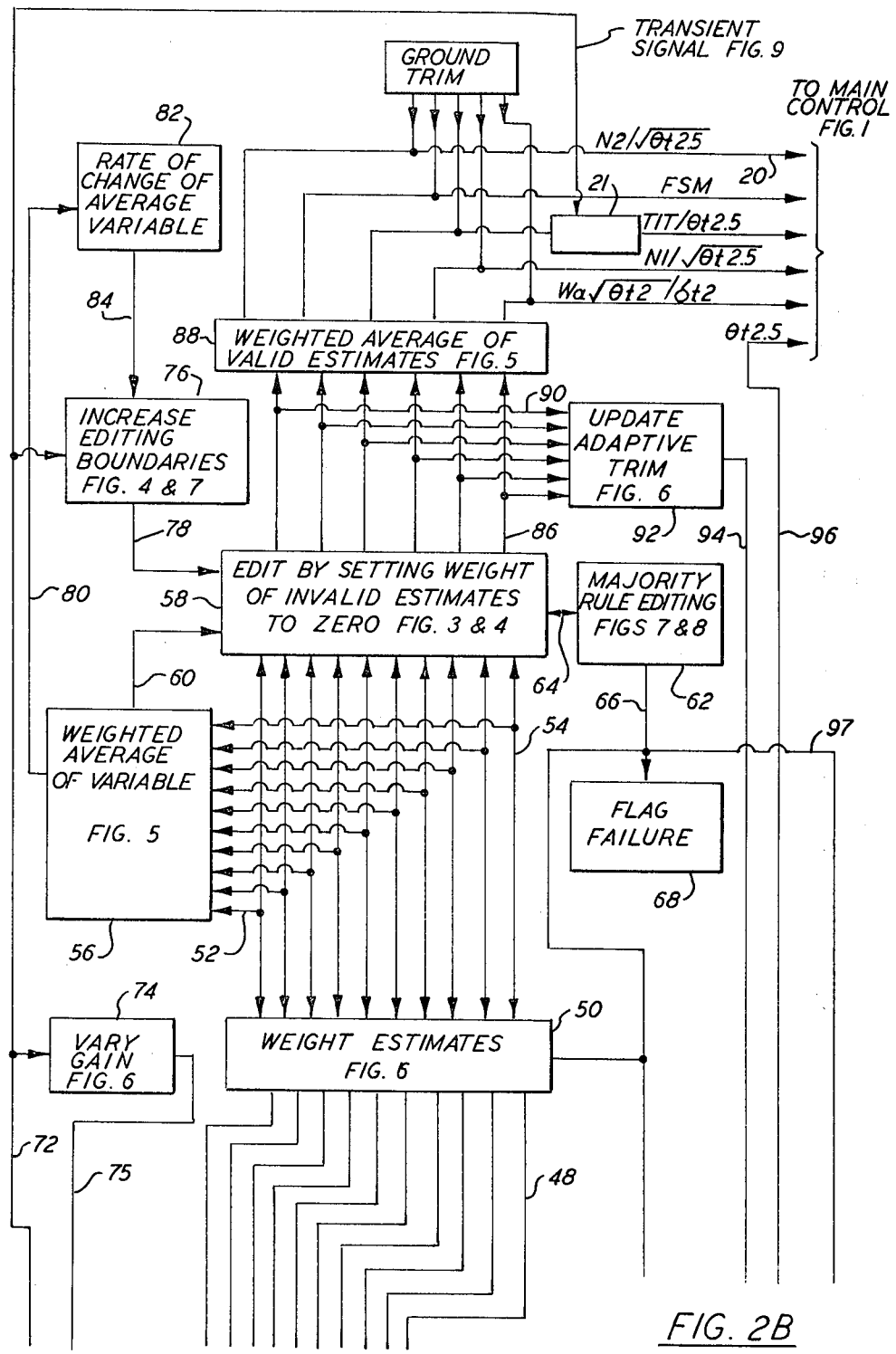

FIGS. 3 through 11A show a specific analog implementation of the control system, and more particularly the self-correcting logic 18 of FIG. 1 as described schematically in FIGS. 2A & 2B. As with the description of FIGS. 2A & 2B, the description will be limited to the computation of only one of the five controlled variables, corrected high rotor speed $N_2/\sqrt{\theta_{t2.5}}$. Similar analog circuitry with different gains but utilizing the same five corrected parameters 40 would be necessary to produce estimates of the other four controlled variables. FIGS. 3 through 11A are interconnected, but the connecting lines between the figures have been omitted for purposes of clarity. The connections are indicated by like symbols in each figure.

For ease of description the five corrected feedback parameters 40 of FIG. 2A will be denoted $S_1$, $S_2$, $S_3$, $S_4$ and $S_5$, and the controlled variable will be denoted Y. The weighting factor applied to each estimate of the controlled variable Y will be denoted W. Subscripts will be used to identify each of the ten estimates of the controlled variable.

As described previously, it is immaterial whether the signals $S_1$–$S_5$ are corrected feedback parameters as shown by reference numeral 40 of FIG. 2A or the actual sensor signals 16 of FIG. 2A the corrected feedback parameters being preferred in the present embodiment of a control system for a turbojet engine. In other embodiments it may not be necessary to correct the sensor signals.

From the five signals $S_1$–$S_5$, ten combinations of pairs of signals are provided in the parallel circuits of FIG. 3. It is assumed for clarity of description that the signals $S_1$–$S_5$ are analog electrical signals and the components of FIGS. 3–11A are analog electronic components. Also with respect to FIGS. 3, 4, and 6, only three of the ten parallel circuits necessary for producing the ten estimates of the controlled variable are shown for purposes of simplicity.

As shown in FIG. 3, each of the ten nonordered pairs of feedback parameter signals $S_1$-$S_2$, $S_1$-$S_3$-$S_4$-$S_5$ is properly scaled by ten pairs of potentiometers $P_1P_2$, $P_3P_4$-$P_{19}P_{20}$, as a function of the relationship of the feedback parameters to the controlled variable. Numerical examples will be provided in Table II to be described subsequently. Each pair of scaled feedback parameter signals is combined by ten summing amplifiers $A_1$, $A_2$-$A_{10}$ to produce ten independent estimates of the variable Y being controlled, the estimates being denoted in FIG. 3 as signals $Y_{1E}$, $Y_{2E}$-$Y_{10E}$.

The settings of potentiometers $P_1$-$P_{20}$ are held constant and are predetermined by the process, being equal to transfer coefficients for translating combinations of feedback parameters into estimates of the variable being controlled. For an example describing a preferred method of establishing the transfer coefficients, reference may be had to U.S. Pat. No. 3,851,157.

The ten independent estimates of the controlled variable $Y_{1E}$, $Y_{2E}$-$Y_{10E}$, are respectively fed into summing amplifiers $A_{11}$, $A_{12}$-$A_{20}$ where an adaptive trim correction $\Delta Y_1$, $\Delta Y_2$-$\Delta Y_{10}$ is added to each independent estimate respectively. The adaptive trim correction signals are produced as described in FIG. 6 and may be zero.

The ten resultant trimmed estimates of the variable of operation $Y_1$, $Y_2$-$Y_{10}$ produced in amplifiers $A_{11}$, $A_{12}$-$A_{20}$, are fed to the circuitry of FIG. 4 and simultaneously fed to ten triple potentiometers $P_{21}$, $P_{22}$-$P_{30}$ respectively. One of the three potentiometer elements is adjusted to apply to the respective estimates of the controlled variable $Y_1$, $Y_2$-$Y_{10}$ the appropriate weighting factor $W_1$, $W_2$-$W_{10}$ to produce the ten weighted estimates $Y_1W_1$, $Y_2W_2$-$Y_{10}W_{10}$. The second of each of the potentiometer elements is supplied by a constant reference voltage $R_1$, $R_2$-$R_{10}$, and each potentiometer is adjusted so that its output is equal to the weighting factor $W_1$, $W_2$-$W_{10}$. Consequently, the first two elements of each of the triple potentiometers $P_{21}$, $P_{22}$-$P_{30}$ produce two outputs, one output consisting of the validated weighted estimate of the variable $Y_1W_1$, $Y_2W_2$-$Y_{10}W_{10}$, and the other output being the corresponding weighting factors $W_1$, $W_2$-$W_{10}$. The third element of the triple potentiometers will be described with respect to FIG. 6.

The weighting factors are selected to give more weight to the more reliable combinations of sensed signals for estimating the controlled variable. A preferred way of selecting the weighting factors $W_1$, $W_2$-$W_{10}$ is to make them inversely proportional to the root-sum-square error in the controlled variable Y that results from one standard deviation in error in each of the pairs of feedback parameters $S_1S_2$, $S_1S_3$-$S_1S_5$. Additional weight may be given to pairs of sensors of any type when redundant readings agree within specified limits. For example, in a simplified format, if two signals of one type agree within specified limits, the weighting factor for each signal may be multiplied by 2, whereas if redundant signals disagree, or if there is only one signal of a particular type, the multiplying factor may be set at 1. When selecting weighting factors, it is important to limit the authority of any signal in order to avoid retention of bad signals and the editing of good signals. A preferred method is to select weighting factors that limit the voting rights of any sensor to less than 45% of the total votes.

Estimates of the controlled variable can be made from any pair of feedback parameters. It is apparent however, that some estimates are much more accurate than others. From the ten different feedback parameter signals, there are ten possible nonordered pairs that will give an estimate of the controlled variable. If the estimates from the ten different pairs are combined into a weighted average estimate of the controlled variable, a greater accuracy is provided than with using only the feedback from any given pair of sensors because the mean or average of many readings has a lower statistical variance than any of the individual elements.

As shown in detail in FIG. 4, each estimate of the controlled variable $Y_1$, $Y_2$-$Y_{10}$ is compared with the average estimate, $\overline{Y}$. If any estimate differs from the average estimate by more than a preselected amount as determined by a permissible error, the editing signal V for that estimate is of positive polarity. If the difference between the estimate and the average estimate is less than the permissible error, the editing signal for that estimate is zero. If an estimate is edited, both the weighted estimate and the weighting factor for that estimate are set to zero. If an estimate is not edited, the weighted estimate and weighting factor remain unchanged. Only a positive editing signal V causes the estimate to be edited. The values of the weighted estimate and weighting factor after editing are referred to as validated estimates and are denoted by a prime (') to distinguish them from the values before editing. For example, referring to FIG. 3, if the estimate of the variable $Y_1$ produced from the combination of feedback parameters $S_1S_2$ is considered to be invalid, an editing signal $V_1$ is generated (in FIG. 4) which is of a positive polarity, and a normally closed double pole switch $Q_1$ is opened, thereby editing this estimate by setting both the weighted estimate of the variable $Y_1W_1'$, and the corresponding weighting factor $W_1'$ equal to zero. If the editing signals $V_1$ and $V_{1M}$ are both zero, thereby indicating that the estimate of the variable $Y_1$ produced by the combination of feedback parameters $S_1S_2$ is a valid estimate, the switch $Q_1$ remains closed, and the weighted estimate of the variable $Y_1W_1'$ as well as the weighting factor $W'$ remain equal to the signals produced by the potentiometer $P_{21}$, namely $Y_1W_1$ and $W_1$. Validated weighted estimates of the controlled variable $Y_1W_1'$ and weighting factors $W_1'$ are passed to FIG. 5. Invalid estimates are automatically excluded from control by a zero weighting factor. Corresponding editing signals $V_2$-$V_{10}$ and corresponding double pole switches $Q_2$-$Q_{10}$ perform the same computations for the other nine estimates of the variable $Y_2$-$Y_{10}$, produced by the other nine combinations of feedback parameters.

As will be explained subsequently, a second editing signal $V_M$ is produced by the majority rule circuits described in conjunction with FIGS. 7 and 8, the second editing signal $V_M$ permanently removing the estimate of the controlled variable and its weighting factor from the computation of revised estimate of the controlled variable. OR gates $OR_1$, $OR_2$–$OR_{10}$ in FIG. 3 receive both the temporary editing signals $V_1$, $V_2$–$V_{10}$ and the permanent editing signals $V_{1M}$, $V_{2M}$–$V_{10M}$, so that the normally closed double pole switches $Q_1$, $Q_2$–$Q_{10}$ will be opened if either a temporary editing signal V or a permanent editing signal $V_m$ is applied to any of the OR gates.

The temporary editing signals $V_1$, $V_2$–$V_{10}$ are computed as shown in FIG. 4. Again there are ten identical parallel circuits, one for each of the ten estimates of the controlled variable, of which only three are shown for purposes of clarity.

In the circuits of FIG. 4, the weighted average estimate of the variable $\overline{Y}$, which is generated in FIG. 5, is fed to each of ten difference amplifiers $A_{31}$, $A_{32}$–$A_{40}$. The individual estimate of each of the controlled variables $Y_1$, $Y_2$–$Y_{10}$ generated in FIG. 3, is also fed to the appropriate amplifier $A_{31}$, $A_{32}$–$A_{40}$. The output from each amplifier, denoted $D_1$, $D_2$–$D_{10}$, is the difference between the average weighted estimate of the controlled variable, $\overline{Y}$, and each individual estimate of the controlled variable, i.e., the error of each individual estimate. The difference signals are fed to the adaptive trim circuit of FIG. 6, and also are compared with predetermined errors E, which define steady state editing boundaries. These editing boundaries are widened during transients both in response to a transient signal, computed in FIGS. 9, 9A, 9B and 9C and also in response to the change in the controlled variable over a small, specified time interval. This widening of editing boundaries during transients will be discussed in detail later. If the difference Di between an estimate of the controlled variable Yi and the weighted average estimate $\overline{Y}$ is relatively small and therefore falls within the allowable range of error then the estimate of the controlled variable is not edited and the original estimate is included in the final weighted average estimate of the controlled variable. If, however, one or more of the estimates of the controlled variable, $Y_1$, $Y_2$–$Y_{10}$ differs significantly from the weighted average estimate of the controlled variable, $\overline{Y}$, the estimate or estimates will likely fall outside the range of the permissible error and will therefore be temporarily edited. The edited estimate or estimates are thereby temporarily eliminated from the computation of the revised weighted average estimate $\overline{Y}$ performed in FIG. 5.

Referring to FIG. 4, a signal indicative of a permissible steady state error, E, is fed into 10 independent adding circuits denoted by amplifiers $A_{101}$, $A_{102}$,–$A_{110}$. The permissible error E may be determined in any known manner, and will obviously depend upon the characteristics of the sensors. A preferred manner for determining the steady state error E is to use 3 standard deviations of error in each of the sensors involved in the estimate, transform each of these errors into corresponding errors in the controlled variable using appropriate elements of the linear matrix model of the engine and then root-sum-square these two errors to obtain an estimate of the error in the controlled variable E resulting from three standard deviations of error in each of the sensed parameters. The system will operate satisfactorily with a large range of permissible errors, for example, between one and twelve standard deviations from the mean, depending on the characteristics of the control system. Wider editing corridors, for example, plus or minus six standard deviations, result in reduced editing and increased errors if a sensor failure occurs, whereas narrower editing corridors result in increased editing and reduced error but higher possibility of deleting a good sensor.

Estimates of controlled variables have increased error during transients due to approximate compensation for process lags and sensor lags. The magnitude of these errors is estimated by mathematical modeling, with good sensors. Transient parameters $ET_i$ are defined so that the product of $ET_i$ and the transient signal is equal to the error in each estimate of the controlled variable due to power lever transients. The steady state error $E_i$ and the error due to inadequate lag compensation is combined by amplifiers $A_{101}$, $A_{102}$–$A_{110}$ to produce permissible error signals $EP_1$, $EP_2$–$EP_{10}$.

Figure 12:
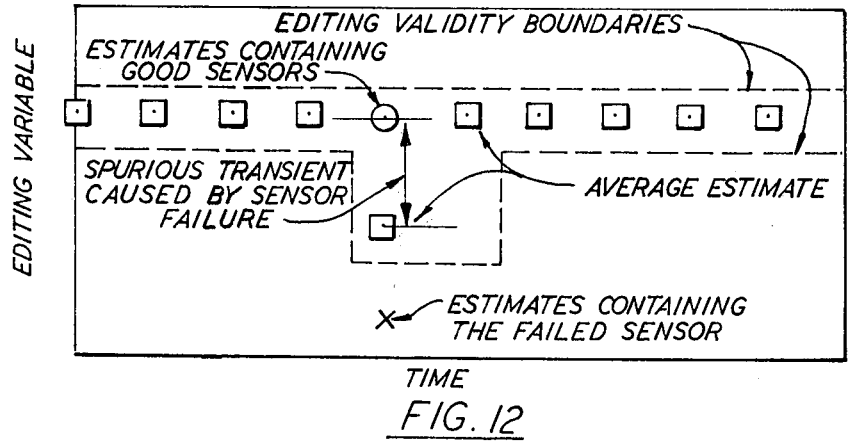
FIG. 12 is a schematic illustrating editing boundaries being temporarily increased by sensor failures.

A further non-symmetrical widening of editing boundaries is required to allow for spurious transients caused by sensor failures. The reason for this increase in editing boundaries is illustrated by FIG. 12. Let all the estimates prior to a sensor failure be equal to the average estimate, then let a sensor fail by losing part of the signal. The average estimate will drop due to the sensor failure as illustrated by FIG. 12. If editing boundaries are not widened then both good and bad estimates would be outside validity boundaries. On the other hand if the validity boundaries were widened symmetrically then both good and bad estimates would be within validity boundaries. It is therefore desired to increase the boundaries only in an upward direction when the average estimate has dropped and only in a downward direction when the average estimate has increased. In FIG. 12 the initial sensor failure caused a drop in the average estimate and therefore an increase in the boundaries in an upward direction. The increase in the average estimate when the failed sensors were edited from the average caused a downward increase in the editing boundaries. The editing boundaries then return to the normal width after editing has been completed.

In the circuit of FIG. 4, editing boundaries $EP_i$ are maintained during a transient while the error Di is reduced non-symmetrically. This procedure has the same effect on editing as procedure illustrated by FIG. 12 and described above. If the average estimate has just dropped then errors from estimates that are below the average are not changed while errors from estimates that are above the average are reduced by the same amount as the average changes. Conversely, if the average estimate has just increased then errors will be reduced only in estimates that are below the average. Referring to FIG. 4, the average estimate $\overline{Y}$ is subtracted from the lagged value of $\overline{Y}$ in amplifiers $A_{111}$, $A_{112}$–$A_{120}$ to produce signals $\Delta \overline{Y}_1$, $\Delta Y_2$–$\Delta \overline{Y}_{10}$ which are positive if the average estimate has just decreased. These signals are scaled to half the original value by potentiometers $P_{121}$, $P_{122}$–$P_{130}$. The resultant halved signals are added algebraically to the error signals $\overline{Y}-Y_1$, $\overline{Y}-Y_2-\overline{Y}-Yn$ in amplifiers $A_{131}$, $A_{132}$–$A_{140}$. The absolute value of these halved signals is subtracted from the absolute value of the modified error signals in amplifiers $A_{141}$, $A_{142}$–$A_{150}$. The output from amplifiers $A_{141}$, $A_{142}$–$A_{150}$ is the absolute value of the error signal after it has been reduced by the non-symmetrical procedure used to avoid editing during spurious transients. For example, if the value of $\overline{Y}$ has dropped the value of $\Delta \overline{Y}$ is positive then (a) if $Y_1$ is lower than $\overline{Y}$, $(\overline{Y}-Y_1)$ is positive, amplifier $A_{131}$ will increase this error signal and amplifier $A_{141}$ will decrease the error signal to the original value so the input to amplifier $A_{151}$ will be the changed error signal $|\overline{Y}-Y_1|$. (b) On the other hand, if $Y_1$ is higher than $\overline{Y}$, $(\overline{Y}-Y_1)$ is negative, amplifier $A_{131}$ will decrease the absolute value of the error signal and amplifier $A_{141}$ will further decrease the absolute value of error signal so that the input to $A_{151}$ will be the reduced error signal ($"\overline{Y}-Y_1|-|\Delta Y_1|$).

The absolute values of the modified error signals are compared to the permissible error signals $EP_1$, $EP_2$–$EP_{10}$ in comparators $A_{151}$, $A_{152}$-$A_{160}$. The resultant output signals from the comparators $A_{41}$, $A_{42}$-$A_{50}$ are fed to AND circuits $AND_1$, $AND_2$-$AND_{10}$.

A positive reference signal REF is also fed to each of the ten AND circuits. If the absolute error $E_A$ of any of the ten parallel circuits is greater than the permitted error $E_p$, the signal entering the respective AND circuit from the difference amplifier will be positive and the AND circuit will produce a positive output, i.e. a positive value editing signal $V_1$, $V_2$-$V_{10}$. If the absolute error $E_A$ is less than the permitted error $EP_1$, the input to the respective AND circuit is negative thereby providing a zero value to the editing signal. The editing signals $V_1$, $V_2$-$V_{10}$, either of positive or zero polarity, are passed back to the switches $Q_1$, $Q_2$-$Q_{10}$ in FIG. 3, and also to the adaptive trim circuit of FIG. 6.

The validated weighted estimates of the controlled variable $Y_1W_1'$, $Y_2W_2'$-$Y_{10}W_{10}'$ from FIG. 3 are fed in FIG. 5 to a summing amplifier $A_{24}$, while corresponding validated values of the weighting factors $W_1'$, $W_2'$-$W_{10}'$ From FIG. 3 are summed by amplifier $A_{25}$. One or more of the signals fed to the amplifiers $A_{24}$ and $A_{25}$ may be zero if editing has occurred in FIG. 3. The summed signals from amplifiers $A_{24}$ and $A_{25}$ are fed to a divide circuit $DIV_2$ which provides the validated estimate of the controlled variable $\overline{Y}$. The computation in FIG. 5 is analogous to that shown in block 88 of FIG. 2. The validated estimate of the controlled variable $\overline{Y}$ is then fed to the main control 22 of FIG. 1 with the validated estimates of the other four controlled variables and used to regulate the engine 10 via control values 12 or 14, and signal control lines 28 and 29.

In the prior art control systems such as disclosed in U.S. Pat. No. 3,851,157, changes in the controlled process may be incorrectly identified as a sensor failure. Changes to a process can occur due to deterioration, changes in operating requirements such as bleed and power extraction on a turbofan engine, changes in the operating environment, overhaul and repair. The present invention adds an adaptive trim circuit described in detail in FIG. 6 to the prior art system to broaden the control to include processes subject to change.

Figure 6:
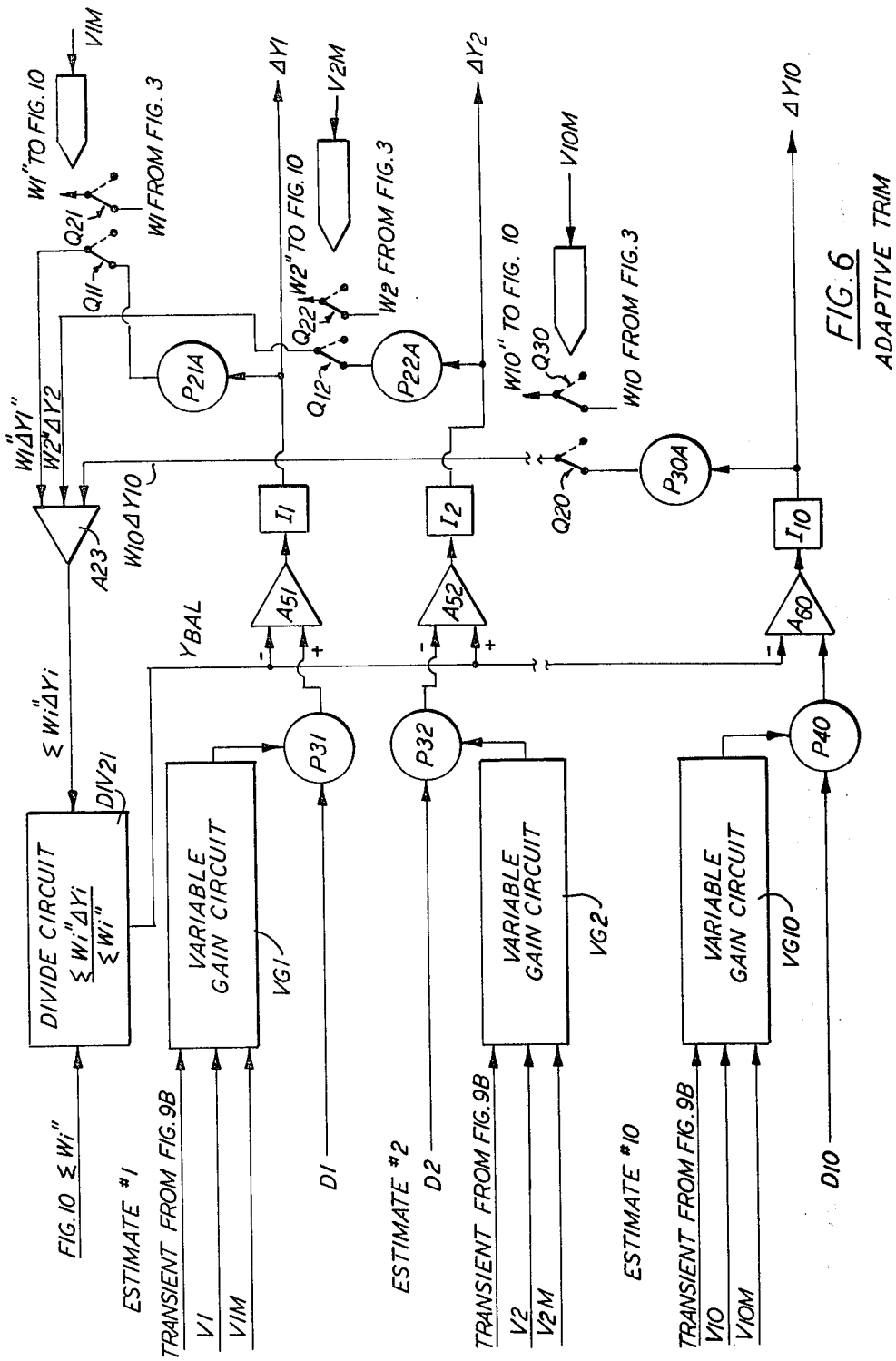
FIG. 6 is a diagram showing the adaptive trim of the portion of the self-correcting control of FIG. 2.

The adaptive trim circuit of FIG. 6 contains an integrator for each estimate of the controlled variable. All integrators are subject to drift, which, in this case, could cause unintentional changes in the desired process level. Error compensation is included in the adaptive trim circuit to limit the effect of adaptive trim to editing only and thereby prevent the adaptive trim from affecting the desired process level.

With adaptive trim it is important to disconnect sensor failures as soon as they are identified because the integrators in the adaptive trim circuit will gradually include the error into the control setting. Further, there is a possibility that an estimate of the controlled variable with low weight may never be disconnected if the adaptive trim rate equals or exceeds the error rate. Even if the sensor is eventually disconnected, some of the error will be permanently introduced into the control setting by the integrator. A secondary editing system based on a majority rule principle is included in this invention, and described with respect to FIGS. 7 and 8, to exclude estimates of the controlled variable based on failed sensors that pass undetected through the primary editing screen. Recognition of a sensor failure is accomplished by a majority rule which examines failure patterns. Editing by majority rule may be carried out with only one variable, or all variables.

In the example described herein, a single sensor failure will cause error in four specific estimates of the controlled variable out of the ten estimates. The majority rule editing process is based on the fact that if three of the four estimates in an error set are temporarily disconnected, then the failed sensor is identified by the error set, all estimates involving the failed sensor are permanently disconnected from control, and adaptive trim and error compensation on all such estimates are discontinued and the failed sensor is flagged, that is, a visual indication of a failed sensor is provided.

With respect to the embodiment of the invention described in the present application, the sensors 16 of FIG. 2A provide information to a block 38 from which are calculated corrected feedback parameters 40, and estimates of the controlled variables are made from pairs of the corrected feedback parameters. Hence, with respect to the present description the majority rule editing procedure is applicable to the corrected feedback parameters 40 as opposed to the sensor input signals 16.

The parameter $\theta_{t2.5}$ is a validated parameter based on redundant $T_{t2.5}$ sensors, consequently a failure detect of one of the corrected parameters $N_1/\sqrt{\theta_{t2.5}}$, $N_2/\sqrt{\theta_{t2.5}}$ and $FTIT/\theta_{t2.5}$ will flag failures in the $N_1$, $N_2$ and FTIT sensors, respectively. A failure detect of the corrected parameter $P_b/P_{T2}$ implies failure of the $P_b$ sensor or the first $P_{T2}$ sensor, or both. Since we cannot discriminate between these two sensors, both sensors are flagged out as having failed and are disconnected from control. Similar coupling of sensors applies to the $P_{S6}$ and second $P_{T2}$ sensor.

In embodiments of the present invention in which it is unnecessary to use corrected feedback parameters, i.e. where the sensor signals themselves are used to provide estimates of the controlled variables, sensor failures may be calculated directly in the majority rule editing procedure. In any case, the majority rule editing, described with respect to FIGS. 7 and 8, is a useful tool to permanently include estimates of the controlled variable produced by erroneous feedback parameter data resulting from failed sensors. Table I below illustrates the possible ten nonordered pair combinations of corrected feedback parameters, $S_1$, $S_2$-$S_5$ and the ten estimates of each of the controlled variables $Y_1$, $Y_2$-$Y_{10}$ provided by the various combinations.

TABLE I

| Estimate of Controlled Variable | Combinations of Feedback Parameter Signals |
|---|---|
| $Y_1$ | $S_1$, $S_2$ |
| $Y_2$ | $S_1$, $S_3$ |
| $Y_3$ | $S_1$, $S_4$ |
| $Y_4$ | $S_1$, $S_5$ |
| $Y_5$ | $S_2$, $S_3$ |
| $Y_6$ | $S_2$, $S_4$ |

TABLE I-continued

| Estimate of Controlled Variable | Combinations of Feedback Parameter Signals |
|---|---|
| $Y_7$ | $S_2, S_5$ |
| $Y_8$ | $S_3, S_4$ |
| $Y_9$ | $S_3, S_5$ |
| $Y_{10}$ | $S_4, S_5$ |

It may be seen that a failure in a sensor or sensors which produces an error in the corrected feedback parameter designated $S_1$ would cause errors in estimates 1, 2, 3 and 4 of the controlled variable, while a failure in the corrected parameter $S_2$ would cause errors in estimates 1, 5, 6 and 7 of the controlled variable. Similarly, each sensor affects four specific estimates of a controlled variable.

Figure 7:
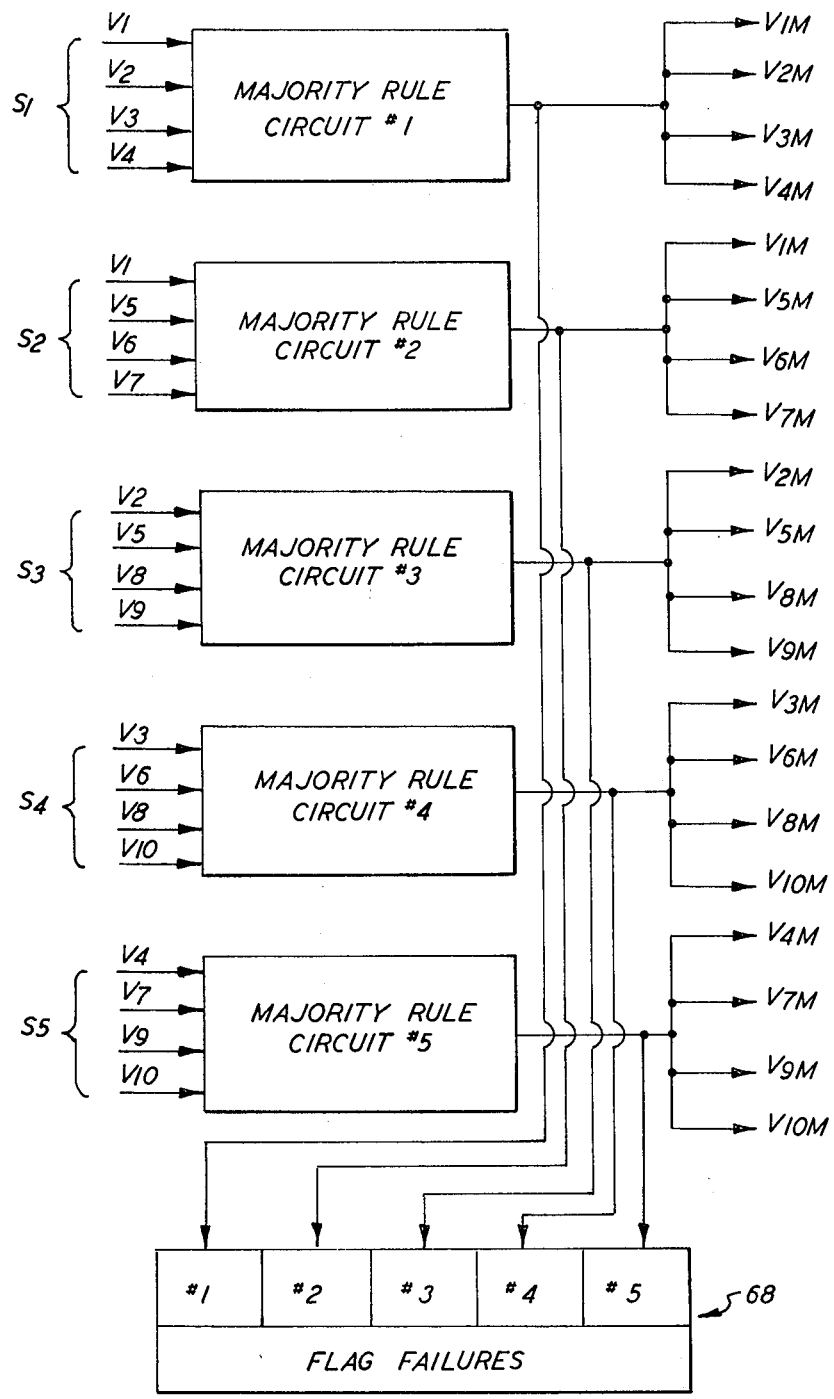
FIG. 7 is a schematic diagram of the portion of the self-correcting control of FIG. 2 which provides majority rule editing and flags sensor failures.

Referring specifically to FIG. 7, there are shown five majority rule circuits 1 through 5. Each majority rule circuit receives four input signals comprising four of the ten different editing signals $V_1$, $V_2$–$V_{10}$ produced by the circuitry of FIG. 4. Each majority rule circuit receives the four editing signals which correspond to the estimates of the controlled variable $Y_1$, $Y_2$–$Y_{10}$ which include one of the five corrected feedback parameters $S_1$, $S_2$–$S_5$. For example, with reference to Table I, estimates $Y_1$ through $Y_4$ include feedback parameter signal $S_1$. Consequently, the majority rule circuit number 1 of FIG. 8 receives as an input thereto the editing signals $V_1$, $V_2$, $V_3$ and $V_4$. According to the majority rule, if any three of the four editing signals are positive indicating an excessive error in the corresponding estimates of the controlled variable, the corrected feedback parameter signal $S_1$ will be permanently disconnected from the control. When this occurs, permanent editing signals $V_{1M}$, $V_{2M}$, $V_{3M}$ and $V_{4M}$ are produced. These permanent editing signals are then fed to the circuits of FIGS. 3 and 6. If a majority rule circuit senses the presence of three or more temporary editing signals, it also feeds a signal to block 68, flag failures, where a visual signal of a failure is indicated such as by an LED display. The failed sensor may then be indentified. A further signal is transmitted by line 97 on FIG. 2B to block 70 so that a failed sensor is excluded from the transient signal, as illustrated by switches Q214, Q215 and Q216 on FIG. 9A.

The construction of a typical majority rule circuit is shown in FIG. 8, majority rule circuit number 1 being representative. There are shown in FIG. 8 four AND gates, $AND_{1-4}$, which receive as input signals thereto temporary editing signals $V_1$, $V_2$, $V_3$; $V_2$, $V_3$, $V_4$; $V_1$, $V_3$, $V_4$; and $V_1$, $V_2$, $V_4$; respectively. If all three of the editing signals received by an AND gate are positive, the AND gate will be actuated and will pass a signal to the OR gate $OR_{11}$ which will initiate a latch circuit and produce the four permanent editing signals as shown in FIG. 7. Obviously, other constructions of the majority rule circuits will be apparent to those skilled in the art. In effect, when any three of the four temporary editing signals are positive indicating errors, all four of the estimates of the variable of operation produced by the erroneous one of the corrected feedback parameters will be permanently disconnected.

With reference to FIG. 3, the permanent editing signals $V_{1M}$, $V_{2M}$–$V_{10M}$ are connected to the OR gates $OR_1$, $OR_2$–$OR_{10}$. When the permanent editing signals are present they will actuate the relays $Q_1$, $Q_2$–$Q_{10}$ and set the weighted estimates of the controlled variable and the weighting factors to zero, thereby permanently disconnecting these estimates and their weighting factors from the final estimate of controlled variable. A similar permanent editing scheme is shown in FIG. 6, to disconnect failed sensors from the adaptive trim.

The adaptive trim circuitry, blocks 46 and 92 of FIG. 2, is shown in detail in FIG. 6. Again, ten independent adaptive trim circuits are needed, but only three are shown for purposes of clarity. The main purpose of the adaptive trim is to trim out the differences between the individual estimates of the controlled variable, and the average of the controlled variable, without affecting the value of the average. In the adaptive trim circuit, the difference signals $D_1$, $D_2$–$D_{10}$ produced in FIG. 4, and which are proportional to the difference between each trimmed estimate of the controlled variable and the average value of the controlled variable, are fed respectively to potentiometers $P_{31}$, $P_{32}$–$P_{40}$. The potentiometer normally provide to the difference signals a fixed gain, but the gain of the potentiometers may be varied by variable gain circuits $V_{G1}$, $V_{G2}$–$V_{G10}$. The variable gain circuits correspond to block 74 of FIG. 2. Each variable gain circuit receives three input signals, viz, a transient signal, the corresponding temporary editing signal V, and the corresponding permanent editing signal $V_M$. Any variation from the fixed gain of the potentiometers is determined by the presence of one or more of the input signals to the corresponding variable gain circuit. In general, the presence of the transient signal, only, will cause the potentiometer to provide increased gain to the difference signal. The presence of the temporary editing signal V will reduce the gain while the presence of the permanent editing signal $V_M$ will set the gain of the potentiometer to zero regardless of the presence of the other two signals. Furthermore, the gain produced by the presence of the transient signal may be a fixed gain, or may be proportional to acceleration or some other parameter depending on the implementation of the circuitry. In any case, the variable gain circuit will provide to the corresponding potentiometer a signal which will increase or decrease the gain of the potentiometer from its normal value.

The output from each of the potentiometers is fed as one input to one of the summing amplifiers $A_{51}$, $A_{52}$–$A_{60}$. A second input denoted $Y_{BAL}$ is also fed to each of the amplifiers. The output from each of the amplifiers $A_{51}$, $A_{52}$–$A_{60}$ is fed directly to integrators $I_1$, $I_2$–$I_{10}$, respectively. Precision errors in any of the components of the system, particularly those shown in FIGS. 3 and 4, will cause drift in the output from the integrators with a resultant change in the ground trim setting of the control. The correction signal $Y_{BAL}$ is input to summing amplifiers $A_{51}$, $A_{52}$–$A_{60}$ to prevent any change in the ground trim setting of the control. The resultant signals are then fed through the integrators $I_1$, $I_2$–$I_{10}$ to produce adaptive trim signals $\Delta Y_1$, $\Delta Y_2$–$\Delta Y_{10}$.

The precision correction $Y_{BAL}$ is determined by a feedback circuit around the integrators which forces the weighted average of the adaptive trim signals toward zero. This in turn insures that the weighted average estimate of the controlled variables $\overline{Y}$ is not changed by the adaptive trim circuit. To accomplish the correction, the adaptive trim signals $\Delta Y_1$, $\Delta Y_2$–$\Delta Y_{10}$ are weighted by the third element of the weighting potentiometers $P_{21}$, $P_{22}$–$P_{30}$ shown in FIG. 3, the third element being shown in FIG. 6 as $P_{21A}$, $P_{22A}$–$P_{30A}$.

The output from the potentiometers in FIG. 6 is shown as the weighted adaptive trim signals $W_1\Delta Y_1$, $W_2\Delta Y_2$–$W_{10}\Delta Y_{10}$. The weighted trim signals are passed through normally closed switches $Q_{11}$, $Q_{12}$–$Q_{20}$ to a summing amplifier $A_{23}$. The weighting factors $W_i$ from FIG. 3 are passed through normally closed switches. $Q_{21}$, $Q_{22}$–$Q_{30}$ and then summed on FIG. 10 to produce a sum of the weighting factors for those estimates that have not been permanently excluded $\Sigma W_i''$. The output from summing amplifier $A_{23}$, $\Sigma W_i''\Delta Y_i$, is fed to a divide circuit $DIV_{21}$ where it is divided by the sum of the weighting factors $\Sigma W_i''$ computed in FIG. 10. The division performed in the divide circuit $DIV_{21}$ gives the weighted average value of the adaptive trim signals, that is, the precision correction $Y_{BAL}$. Negative feedback of $Y_{BAL}$ is applied to the amplifiers $A_{51}$, $A_{5-2}$–$A_{60}$ to maintain the value of $Y_{BAL}$ close to zero. The variation in gain of potentiometers $P_{31}$, $P_{32}$–$P_{40}$ is used to adjust the rate of adaptive trim. The purpose of adaptive trim is to prevent changes in the process from being interpreted by the editing circuits as failures in the sensors or in the corrected feedback parameters. It is therefore important that the trim rate should be no faster than the process change or the efficiency of the editing process will be impaired. In a turbojet engine, since the engine characteristics change much faster during power lever transients than during aircraft transients or changes due to component deterioration, the trim rate is increased during power lever transients by adjusting the variable gain circuits with the transient signal as previously discussed. Furthermore, when a sensor has failed, or when the corrected feedback parameters provide erroneous results, it is important to exclude such information from all control circuits. Insolated minor excursions out of editing boundaries are treated by reducing the gain of the potentiometers $P_{31}$, $P_{32}$–$P_{40}$ by the variable gain circuit inputs $V_1$, $V_2$–$V_{10}$. However, when a failure has been definitely identified by majority rule, gains of the edited estimates of the controlled variable are reduced to zero by the permanent editing signals $V_{1M}$, $V_{2M}$–$V_{10M}$, the same permanent editing signals being applied to switches $Q_{11}$, $Q_{12}$–$Q_{20}$ to open the switches and force the corresponding weighted trim signals $W_1''\Delta Y_1$, $W_2''\Delta Y_2$–$W_{10}''\Delta Y_{10}$ to zero. The same permanent editing signals are also applied to switches $Q_{21}$, $Q_{22}$–$Q_{30}$ to open the switches and force the corresponding weighting factors $W_1''$, $W_2''$–$W_{10}''$ to zero. In this way, both the weighting factors $W_i''$ and the weighted trim signals $W_i''\Delta Y_i$ for the edited estimates of the controlled variables are reduced to zero and the precision correction $Y_{BAL}$ will be unaffected by erroneous estimates and/or erroneous adaptive trim signals.

Figure 9:
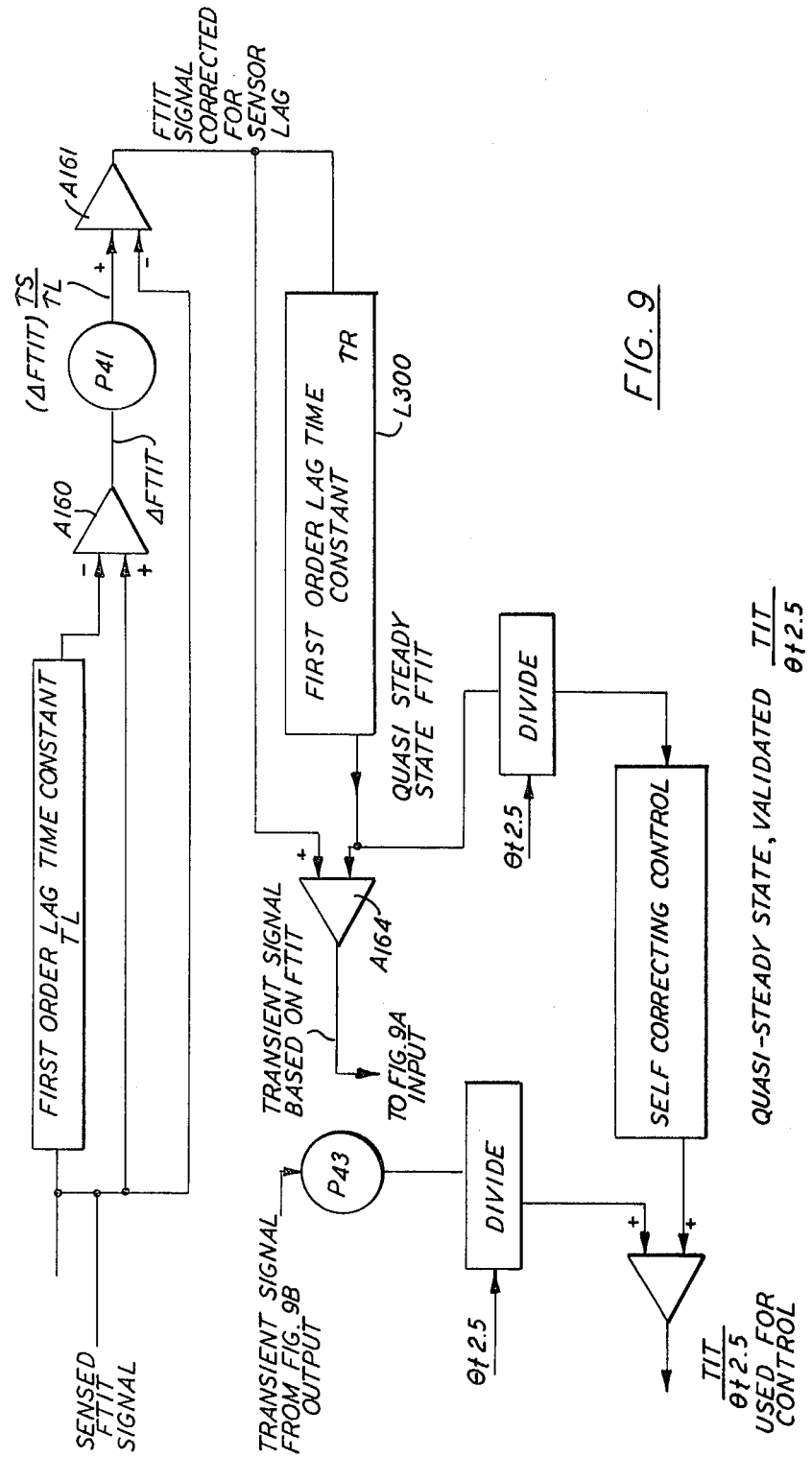
Figure 10:
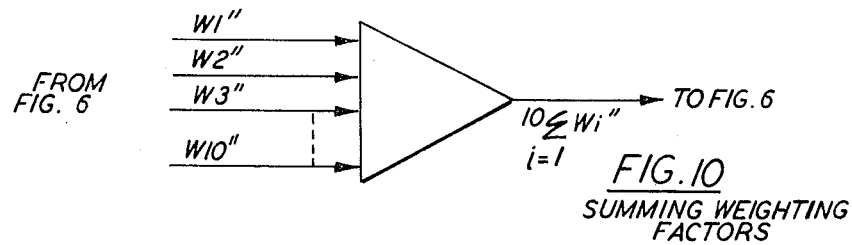
FIG. 10 is a schematic of means of summing the weighting factors of sensors that have not been permanently disconnected.

A method of compensating for sensor lag and process lag is shown on FIG. 9. A lagged value of the FTIT signal is subtracted from the unlagged value in amplifier $A_{160}$ to provide a difference signal proportional to the rate of change of sensed FTIT. This signal is passed through potentiometer $P_{41}$ which multiplies the signal by the ratio of the sensor time constant $T_S$ to the lag time constant $Y_L$. This scaled difference signal is added to the sensed value of FTIT in amplifier $A_{161}$ to provide an estimate of the FTIT signal corrected for sensor lag. This is a standard procedure for compensating for sensor lags using a first order model of the lag. A similar procedure for accounting for process lag using a first order model is shown in the remainder of FIG. 9. In this embodiment the important lag is the lag of rotor speed behind turbine temperature which is modeled by computing a fictitious quasi-steady-state value of turbine temperature that is exactly synchronized with high rotor speed, i.e., if this quasi-steady-state rotor speed were input into a steady state mathematical model of the engine then one of the outputs of the model would be the observed value of high rotor speed $N_2$. Referring to FIG. 9, the FTIT signal corrected for sensor lag is passed through a first order lag, time constant $T_R$, which represents the lag of rotor speed behind turbine temperature. The output from this first order lag is the quasi-steady-state value of fan turbine inlet temperature, FTIT, which is divided by $\theta + 2.5$ and is then fed to the self-correcting control as one of output items from block 38 of FIG. 2. The quasi-steady-state FTIT signal is subtracted from the FTIT signal corrected for sensor lag in amplifier $A_{164}$ on FIG. 9 to obtain a transient signal based on FTIT which is transmitted to the circuit on FIG. 9A, a validated transient signal is obtained from the circuit of FIG. 9B and scaled by potentiometer $P_{43}$ to transform it from fan turbine inlet temperature units to turbine inlet temperature units. The signal is then divided by $\theta_{l2.5}$ to change it to the form of $\Delta TIT/\theta_{l2.5}$ which is then added by amplifier $A_{165}$ to the quasi-steady-state value of $TIT/\theta_{l2.5}$ which leaves the self-correcting control to transform it into the transient value of $TIT/\theta_{l2.5}$ that is used for control. The circuits of FIG. 9 are analogous to blocks 70, 38 and 21 on FIG. 2.

Transient signals are used (a) to vary the gain of the adaptive trim in block 74 of FIG. 2B, (b) to increase editing boundaries during a transient in block 76 of FIG. 2B and (c) to correct TIT from a quasi-steady-state value to a transient value in block 21 of FIG. 2B. To ensure correct editing it is important that the transient signal should be correct. Consequently the circuits of FIG. 9A include transient signals from several sources. Circuits, similar to those shown in FIGS. 3, 4 and 5 are used to edit invalid transient signals and form a weighted average of valid transient signals. There are three transient signals input to the circuits of FIG. 9A; one based on the rate of change of FTIT which is computed in FIG. 9, one based on the measured rate of change of fuel valve position and one based on the rate of change of fuel valve commands. These latter two transient signals are computed in a similar manner to that shown for the transient signal based on the FTIT sensor shown in FIG. 9, i.e., by passing the signal through a first order lag like $L_{300}$ on FIG. 9 and then subtracting the lagged signal from the unlagged signal in an amplifier like $A_{164}$ on FIG. 9. The resultant transient signals are scaled by potentiometer to the same temperature units as the transient signal based on the FTIT sensor. It is noted that the three signals chosen are related and have very small lag between them because a change in fuel valve command causes a change in fuel valve position which in turn causes a change in turbine temperature. These three signals are therefore expected to be in reasonable agreement. On FIG. 9A as in FIG. 3, the three signals $T_{11}$, $T_{12}$ and $T_{13}$ are passed through dual potentiometers $P_{211}$, $P_{212}$ and $P_{213}$ which produce as outputs the product of the transient signal and a weighting factor $T_iW_i$ and also the weighting factor $W_i$. Weighting factors can be selected by any method. A preferred method is to give the highest weight say 45% to the transient signal based on FTIT and to give equal weight to the remaining signals. Again, as in FIG. 3 the weighted signals are passed through normally closed switches $Q_{214}$, $Q_{215}$ and $Q_{216}$ which are opened by validity signals $V_{11}$, $V_{12}$ and $V_{13}$ to prevent invalid signals and the corresponding weighting factors from being included in the weighted averages computed in FIG. 9B. Since the majority rule circuits of FIG. 7 will flag out when the FTIT sensor has failed then an additional signal is provided to switch $Q_{214}$ when the FTIT signal is flagged out as having failed. So switch $Q_{214}$ will open when either the FTIT signal has failed or when failure has occurred in the circuits on FIGS. 9 and 9B that compute and process the transient signal based on the FTIT sensor.

The circuit on FIG. 9C which computes the validity signals $V_{11}$, $V_{12}$ and $V_{13}$ is similar to the circuit shown in FIG. 4 except that the permissible errors $E_{11}$, $E_{12}$ and $E_{13}$ are not increased in response to the transient signal. The validated transient signal $\overline{T}$ which is computed in FIG. 9B is transmitted to four places (a) to FIG. 9 to correct the quasi-steady-state FTIT to transient FTIT (b) to FIG. 9C for editing transient signals (c) to FIG. 4 to increase editing boundaries during a transient and (d) to FIG. 6 to increase the adaptive trim rate during a transient.

It may be necessary to inhibit editing during certain circumstances. For example, if the math model used for editing only reflects engine operation above idle, which is usually the case, then editing should be inhibited during engine starting. Also, if the adaptive trim is not in permanent memory and, say all or part of the trim is lost when the control is switched off, then editing should be inhibited for a few seconds after start-up to enable the adaptive trim to stabilize at the correct value. Even if the adaptive trim is stored in a permanent memory there is still a requirement to inhibit editing when the control is first installed on an engine to enable the adaptive trim to represent conditions in that engine. In each of the above cases, failure to inhibit editing for an initial period may result in the temporary deletion of good estimates and possibly result in permanent deletion by activating the majority rule.

Figure 11:
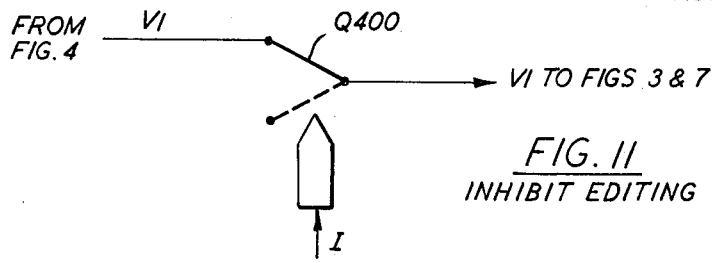
FIGS. 11 and 11A are circuit diagrams to inhibit editing during engine start up.
Figure 11A:
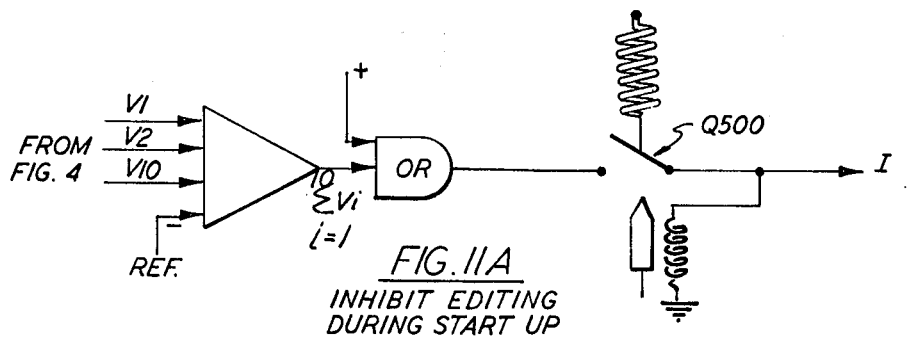

Inhibiting editing during start up can be accomplished using the logic described in FIG. 11. The validity signals from FIG. 4 are fed to a summing amplifier on FIG. 11A. The output from the amplifier goes through an OR circuit. This circuit is designed so that if any of the validity signals $V_1$, $V_2$–$V_{10}$ are positive then a positive signal will be at the input to Q500. If none of the validity signals are positive then a zero signal will be at the input to Q500. When the engine is started, spring loaded switch Q500 is closed by the normal engine starting sequence and then the closing mechanism is released. The switch will remain closed as long as signal I exists, i.e., as long as any one of the signals $V_1$, $V_2$–$V_{10}$ is positive, and switch Q400 on FIG. 11A, and similar switches Q401–Q409 will inhibit editing by disconnecting signals $V_1$, $V_2$–$V_{10}$ from FIGS. 3 and 7. When the engine has been running long enough for the adaptive trim to reduce each of the errors $|\overline{Y}-Y_1|$, $|\overline{Y}-Y_2|-|\overline{Y}-Y_{10}|$, on FIG. 4, below the corresponding steady state permissible errors $EP_1$, $EP_2$–$EP_{10}$ then signals $V_1$, $V_2$–$V_{10}$ from FIG. 4 will be zero, switch Q500 will be opened by the spring and will remain open until the next engine starting sequence. When switch Q500 is open, signal I on FIG. 11A will be zero, signals $V_1$, $V_2$–$V_{10}$ will be connected to FIGS. 3 and 7 and editing will take place, as required.

Table II shown below describes the generation of ten estimates and a weighted average estimate of the controlled variable $N_2/\sqrt{\theta_{t2.5}}$ with the other four feedback parameters. The adaptive trim provided by the present invention is shown together with the weighting factors for each of the estimates. It is noted that none of the ten estimates differs significantly from the weighted average, which in turn does not vary significantly from the actual value of the corrected feedback parameter. The results shown in Table II are actual values produced by simulation of the invention disclosed herein.

TABLE II

| ESTIMATE NUMBER | MATRIX ELEMENT | FEEDBACK PARAMETER | MATRIX ELEMENT | FEEDBACK PARAMETER | ADAPTIVE TRIM | ESTIMATE OF CONTROLLED VARIABLE $N_2/\sqrt{\theta_{t2.5}}$ | WEIGHTING FACTOR |
|---|---|---|---|---|---|---|---|
| 1 | 0 | $(N_1/\sqrt{\theta_{t2.5}})$ | + 1 | $(N_2/\sqrt{\theta_{t2.5}})$ | + 8 | = 10511 | 0.094 |
| 2 | −0.519 | $(N_1/\sqrt{\theta_{t2.5}})$ | + 8.73 | $(FTIT/\theta_{t2.5})$ | + 2338 | = 10516 | 0.121 |
| 3 | 0.334 | $(N_1/\sqrt{\theta_{t2.5}})$ | + 2.16 | $(P_b/\delta_{t2})$ | + 6919 | = 10508 | 0.092 |
| 4 | 0.432 | $(N_1/\sqrt{\theta_{t2.5}})$ | + 12.8 | $(P_{s6}/\delta_{t2})$ | + 6317 | = 10507 | 0.099 |
| 5 | 1.0 | $(N_2/\sqrt{\theta_{t2.5}})$ | + 0. | $(FTIT/\theta_{t2.5})$ | + 8 | = 10511 | 0.094 |
| 6 | 1.0 | $(N_2/\sqrt{\theta_{t2.5}})$ | + 0. | $(P_b/\delta_{t2})$ | + 8 | = 10511 | 0.094 |
| 7 | 1.0 | $(N_2/\sqrt{\theta_{t2.5}})$ | + 0. | $(P_{s6}/\delta_{t2})$ | + 8 | = 10511 | 0.094 |
| 8 | 3.46 | $(FTIT/\theta_{t2.5})$ | + 1.24 | $(P_b/\delta_{t2})$ | + 5095 | = 10515 | 0.118 |
| 9 | 3.99 | $(FTIT/\theta_{t2.5})$ | + 6.52 | $(P_{s6}/\delta_{t2})$ | + 4495 | = 10513 | 0.129 |
| 10 | 9.44 | $(P_b/\delta_{t2})$ | − 43.0 | $(P_{s6}/\delta_{t2})$ | + 8976 | = 10513 | 0.066 |

TABLE II-continued

| ESTIMATE NUMBER | MATRIX ELEMENT | FEEDBACK PARAMETER | MATRIX ELEMENT | FEEDBACK PARAMETER | ADAPTIVE TRIM | ESTIMATE OF CONTROLLED VARIABLE $N_2/\sqrt{\theta_{t2.5}}$ | WEIGHTING FACTOR |
|---|---|---|---|---|---|---|---|
| WEIGHTED AVERAGE ESTIMATE OF $N_2/\sqrt{\theta_{t2.5}}$ | | | | | | = 10511 | |

FEEDBACK PARAMETERS $N_1/\sqrt{\theta_{t2.5}} = 8514$, $N_2/\sqrt{\theta_{t2.5}} = 10503$, $FTIT/\theta_{t2.5} = 1443$, $P_b/\delta_{t2} = 345$, $P_{S6}/\delta_{t2} = 40$ In summary, the present control system prevents incorrected deletions of sensors and/or corrected feedback parameters due to variability in the process being controlled. The control may be implemented in a digital manner providing a smaller control, lower error after failure, and more accurate editing. Furthermore, the control system diagnoses and flags out failed sensors/erroneous corrected feedback parameters.

While the invention has been described in terms of a control system for a turbine engine, it will be apparent to those skilled in the art that other control systems or processes may be implemented in the form of a self-correcting control with adaptive trim and majority rule editing as disclosed herein. It is also apparent that numerous changes may be made to the construction of the invention and its precise details without departing from the scope of the invention as hereinafter claimed.

I claim:

1. An electronic control system for controlling the operation of a turbine type power plant which controls fuel to and geometry of the power plant and utilizes a plurality of sensors for monitoring predetermined engine operating variables, means for synthesizing parameters from signals produced by said sensors indicative of parameters used by said control system, for compensating for deterioration in said power plant, for compensating for errors in said geometry and for detecting a failed sensor, said means including:
   a plurality of sensors having feedback means monitoring a plurality of engine operating variables, function generator means responsive to said feedback means for generating signals that are multiple estimates of the control variables,
   means for applying predetermined weighting factors to said corrected estimated signals for giving priority to any given estimate as a function of the accuracy of said estimate but limited to a maximum weighting factor value to prevent any one sensor from having a voting majority,
   averaging means responsive to said weighted estimate signals by dividing the sum of said weighted estimates by the sum of the corresponding weighting factors to produce weighted average estimate signals,
   adaptive trim means, responsive to said multiple estimates of said control variables and the value of the weighted average, by gradually reducing the error between independent estimates and the corresponding weighted average estimate,
   means for compensating for calculation error and integrator drift to prevent the adaptive trim from altering the ground trim setting of the control by feedback means that drives the weighted sum of adaptive trims to zero,
   editing means for systematically comparing said weighted estimate signals with predetermined boundary limits surrounding the weighted average estimate, means for eliminating any of said estimated signals falling outside of said boundaries while allowing said weighted estimates to be reinstated when falling within said boundary limits,
   actuator means responsive to said weighted average estimate signals for controlling the fuel to the engine and the geometry of the engine.

2. An electronic control system in accordance with claim 1 including additional editing means responsive to said editing means that permanently disconnects estimates that include a failed sensor and flags the sensor failure whenever a predetermined number of estimates of any of said variables exceed editing boundary limits.

3. An electronic control system in accordance with claim 2 including means for varying said boundary limits in accordance with a transient condition in the engine operating envelope, said boundary limits varying means being responsive to a transient signal based on the rate of change of an engine operating parameter.

4. An electronic control system in accordance with claim 3 wherein said transient signal is the rate of change of the fan turbine inlet temperature.

5. An electronic control system in accordance with claim 3 wherein said transient signal is the rate of change of the compressor speed.

6. An electronic control system in accordance with claim 3 wherein said transient signal is the rate of change of said fuel regulating means.

7. An electronic control system in accordance with claim 3 in which said transient signal is a weighted average of the transient signals, means for excluding any transient signal generated by a failed sensor by passing individual transient signals through said editing means so that transient signals based on failed sensors are excluded and said weighted average transient signal is a weighted average of valid transient signals.

8. An electronic control system as in claim 1 including means responsive to the engine start-up condition for rendering said editing means inoperative until estimates of said variables fall within editing boundaries.

9. An electronic control system as in claim 3 including function generator means of estimating controlled variables referenced to a steady state mathematical model of the engine process, means for estimating quasi-steady state values of sensed signals as a function of said transient conditions so that said quasi-steady state signals may be edited using said steady state function generator, means for correcting said quasi-steady state control variable at the output of the editing process to the corresponding transient control variables that are used for controlling fuel to the engine and the geometry of the engine.

* * * * *

UNITED STATES PATENT AND TRADEMARK OFFICE
CERTIFICATE OF CORRECTION

PATENT NO. : 4,423,594
DATED : January 3, 1984
INVENTOR(S) : Stanley H. Ellis

It is certified that error appears in the above-identified patent and that said Letters Patent is hereby corrected as shown below:

Column 3, line 11 "for" should be --or--.

Column 5, line 50 "approciable" should be --appreciable--.

Column 8, line 64 "positon" should be --position--.

Column 12, line 24 "96" should be --92--.

Column 16, line 56 "$\Delta \overline{Y}_1, \Delta Y_2 - \Delta \overline{Y}_{10}$" should be --$\Delta \overline{Y}_1, \Delta \overline{Y}_2 - \Delta \overline{Y}_{10}$--.

Column 17, line 5 "changed" should be --unchanged--.

Column 17, line 10 ("$\overline{Y} - Y_1 | - | \Delta Y_1 |$) should be --($|\overline{Y} - Y_1| - |\Delta Y_1|$)--.

Column 18, line 47 after "signals" insert --16--.

Column 18, line 53 "include" should be --exclude--.

UNITED STATES PATENT AND TRADEMARK OFFICE
CERTIFICATE OF CORRECTION

PATENT NO. : 4,423,594
DATED : January 3, 1984
INVENTOR(S) : Stanley H. Ellis

It is certified that error appears in the above-identified patent and that said Letters Patent is hereby corrected as shown below:

Column 21, line 34 "Insolated" should be --Isolated--.

Column 21, line 61 "$Y_L$" should be --$T_L$--.

Signed and Sealed this

Twenty-fourth Day of April 1984

[SEAL]

Attest:

GERALD J. MOSSINGHOFF

Attesting Officer     Commissioner of Patents and Trademarks